US011417098B1

(12) United States Patent
Campbell

(10) Patent No.: US 11,417,098 B1
(45) Date of Patent: *Aug. 16, 2022

(54) DETERMINING LOCATION COORDINATES OF A VEHICLE BASED ON LICENSE PLATE METADATA AND VIDEO ANALYTICS

(71) Applicant: Waylens, Inc., Cambridge, MA (US)

(72) Inventor: Jeffery R. Campbell, Warkworth (CA)

(73) Assignee: WAYLENS, INC., Cambridge, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/213,291

(22) Filed: Mar. 26, 2021

Related U.S. Application Data

(63) Continuation-in-part of application No. 16/208,861, filed on Dec. 4, 2018, now Pat. No. 10,984,275, which is a continuation-in-part of application No. 16/106,777, filed on Aug. 21, 2018, now abandoned, and a continuation-in-part of application No.
(Continued)

(51) Int. Cl.
| | |
|---|---|
| *G06V 20/40* | (2022.01) |
| *G06K 9/62* | (2022.01) |
| *G06T 5/00* | (2006.01) |
| *G06F 16/2457* | (2019.01) |
| *H04W 4/80* | (2018.01) |
| *G06V 10/24* | (2022.01) |
| *G06V 10/44* | (2022.01) |

(Continued)

(52) U.S. Cl.
CPC ........ *G06V 20/46* (2022.01); *G06F 16/24573* (2019.01); *G06K 9/6215* (2013.01); *G06T 5/006* (2013.01); *G06V 10/243* (2022.01); *G06V 10/443* (2022.01); *H04W 4/80* (2018.02); *G06V 20/625* (2022.01); *G06V 30/10* (2022.01); *G06V 2201/08* (2022.01); *G06V 2201/10* (2022.01)

(58) Field of Classification Search
CPC ...... G06V 20/46; G06V 20/625; G06V 20/62; G06V 20/63; G06V 10/243; G06V 10/443; G06V 30/10; G06V 2201/09; G06V 2201/10; G06T 5/006; G06K 9/6215

See application file for complete search history.

(56) References Cited

U.S. PATENT DOCUMENTS 9,779,309 B1 * 10/2017 Fink .................... G06F 16/7867
10,984,275 B1 * 4/2021 Campbell .............. G06V 20/46
(Continued)

*Primary Examiner* — Ricky Chin
(74) *Attorney, Agent, or Firm* — Christopher P. Maiorana, PC

(57) ABSTRACT

An apparatus including a location device and a processor. The location device may be configured to determine location coordinates of the apparatus. The processor may be configured to receive video frames captured by a capture device, perform video analysis on the video frames to detect objects in the video frames and extract metadata corresponding to the objects detected in the video frames, correlate the metadata with the location coordinates, determine a distance from the apparatus to the objects in the video frames and calculate an absolute location of the objects in response to the distance and the location coordinates. The distance may be determined by comparing a size of the objects detected in the video frames with a known size of the objects. The absolute location for the objects in the video frames may be added to the metadata.

20 Claims, 15 Drawing Sheets

Related U.S. Application Data

15/618,286, filed on Jun. 9, 2017, now Pat. No. 11,151,192, and a continuation-in-part of application No. 15/591,459, filed on May 10, 2017, now abandoned.

(60) Provisional application No. 62/548,548, filed on Aug. 22, 2017.

(51) Int. Cl.
*G06V 20/62* (2022.01)
*G06V 30/10* (2022.01)

(56) References Cited

U.S. PATENT DOCUMENTS

| | | | | |
|---|---|---|---|---|
| 2013/0322763 | A1* | 12/2013 | Heu | G06T 7/246 |
| | | | | 382/195 |
| 2016/0295089 | A1* | 10/2016 | Farahani | H04N 5/247 |
| 2016/0350921 | A1* | 12/2016 | Bataller | G06V 40/173 |
| 2017/0083157 | A1* | 3/2017 | Vice | H04N 9/3185 |
| 2018/0262713 | A1* | 9/2018 | Huang | G06T 15/20 |
| 2020/0280758 | A1* | 9/2020 | O'Rourkes | H04N 21/21805 |
| 2021/0067745 | A1* | 3/2021 | Rosenberg | H04N 9/8205 |

\* cited by examiner

DETERMINING LOCATION COORDINATES OF A VEHICLE BASED ON LICENSE PLATE METADATA AND VIDEO ANALYTICS

This application relates to U.S. Ser. No. 16/208,861, filed Dec. 4, 2018, which relates to U.S. Ser. No. 16/106,777, filed Aug. 21, 2018, which relates to U.S. Provisional Application No. 62/548,548, filed Aug. 22, 2017. This application also relates to U.S. Ser. No. 15/591,459, filed May 10, 2017. This application also relates to U.S. Ser. No. 15/618,286, filed Jun. 9, 2017. Each of the mentioned applications are hereby incorporated by reference in their entirety.

FIELD OF THE INVENTION

The invention relates to video capture generally and, more particularly, to a method and/or apparatus for determining location coordinates of a vehicle based on metadata and video analytics.

BACKGROUND

Dashboard cameras (i.e., dashcams) and other vehicle-mounted cameras are becoming increasingly popular. Video footage captured by a vehicle-mounted camera can be used for safety, insurance claim investigation and incident recreation. Not all vehicles are equipped with vehicle-mounted cameras. Video quality of cameras can vary and storage space is limited. Without vehicle-mounted cameras capable of performing onboard video analytics important events can be missed (i.e., car accidents). Even when the driver records an event, the driver only has one camera-angle. Furthermore, even if the event is recorded the video corresponds to the location of the vehicle-mounted camera, not the event.

Industry and government license plate databases hold a lot of historical data that provides limited usefulness. Current data in databases is limited to license plates and corresponding still pictures along with location and time information. The information is gathered from expensive systems developed for police and automobile repossession agents that employ spotter cars or tow truck drivers. Most drivers do not have access to license plate database information or access to video-mounted camera footage.

It would be desirable to implement determining location coordinates of a vehicle based on metadata and video analytics.

SUMMARY

The invention concerns an apparatus comprising a location device and a processor. The location device may be configured to determine location coordinates of the apparatus. The processor may be configured to receive video frames captured by a capture device, perform video analysis on the video frames to detect objects in the video frames and extract metadata corresponding to the objects detected in the video frames, correlate the metadata with the location coordinates, determine a distance from the apparatus to the objects in the video frames and calculate an absolute location of the objects in response to the distance and the location coordinates. The distance may be determined by comparing a size of the objects detected in the video frames with a known size of the objects. The absolute location for the objects in the video frames may be added to the metadata.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include determining location coordinates of a vehicle based on metadata and video analytics that may (i) implement vehicle-mounted cameras configured to perform local video analytics, (ii) generate metadata corresponding to captured video, (iii) store metadata about multiple vehicles, (iv) provide a searchable database of video metadata, (v) use a current location to determine locations of objects in video, (vi) use video analysis to determine a distance to objects, (vii) determine a license plate size based on a region, (viii) determine a license plate size based on a character string read from a license plate, (ix) compare detected objects to known object sizes, (x) enable event recreation using metadata from a video, (xi) transfer data from a vehicle-mounted camera to a database via a user communication device, (xii) be implemented on a cloud-based database and/or (xiii) use data effectively.

License Plate Recognition (e.g., LPR) technology may be configured to read information from a license plate on a vehicle. Cameras may be implemented to perform license plate recognition and/or object character recognition (OCR). In some embodiments, cameras used for performing license plate recognition may be stationary (e.g., permanently and/or semi-permanently mounted to a fixture such as a lamp post, a building, a street light, etc.). In some embodiments, cameras used for performing license plate recognition may be mobile (or attached to a moving object such as a vehicle). While embodiments of the invention may be described as detecting license plates, the invention may further apply to detecting other types of objects. The types of objects detected may be varied according to the design criteria of a particular implementation.

Figure 1:
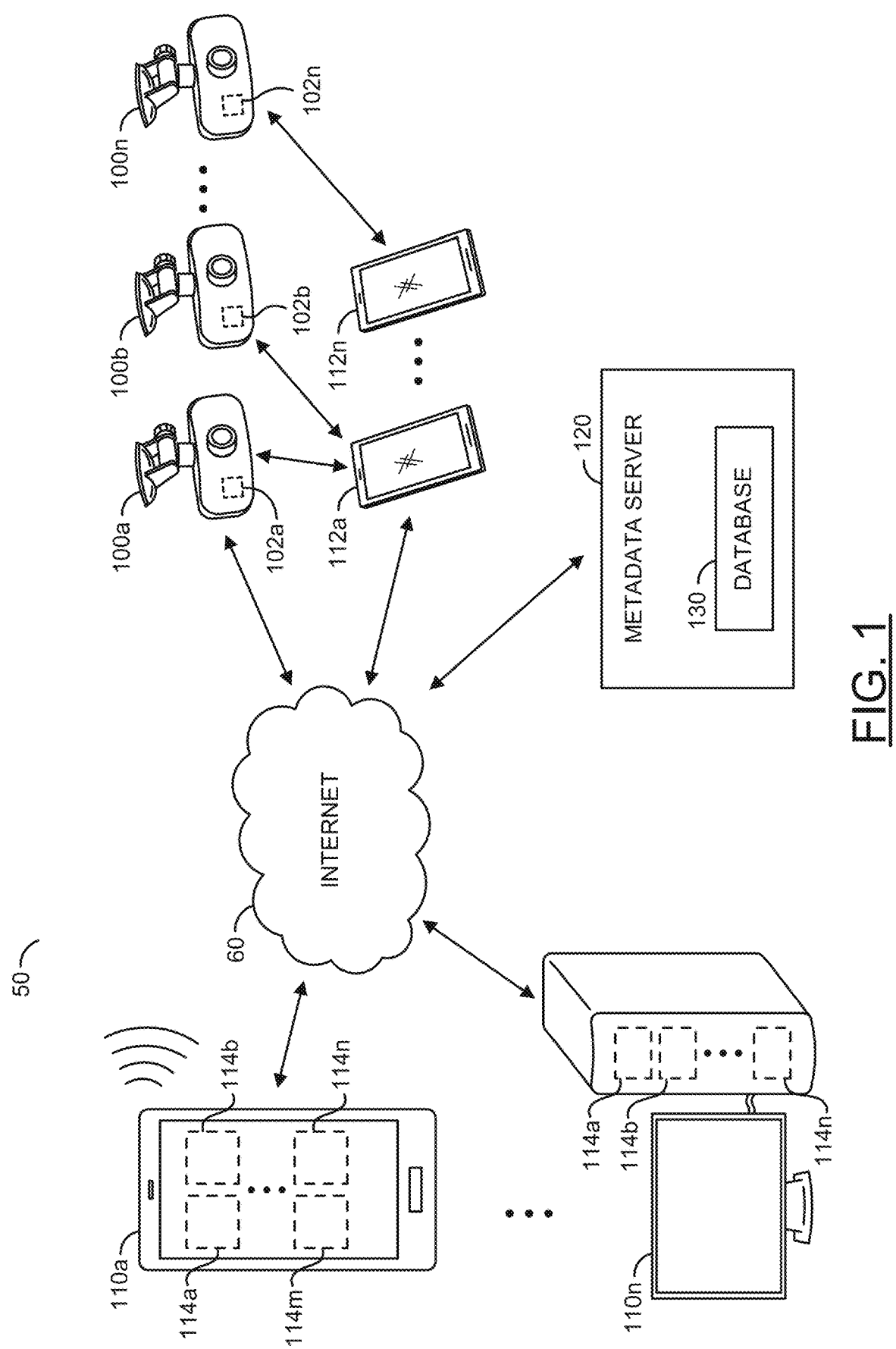
FIG. 1 is a diagram illustrating an example system in accordance with an embodiment of the present invention.

Referring to FIG. 1, a diagram illustrating an example system 50 in accordance with an embodiment of the present invention is shown. The system 50 may comprise a block (or circuit) 60, blocks (or circuits) 100a-100n, blocks (or circuits) 110a-110n, blocks (or circuits) 112a-112n and/or a block (or circuit) 120. The block 60 may be a network. The blocks 100a-100n may implement video capture devices. The blocks 110a-110n may implement subscriber devices (e.g., subscriber communication devices). The blocks 112a-112n may implement user devices (e.g., user communication devices). The block 120 may implement a server computer. The system 50 may comprise other components (not shown). The number and/or types of components implemented by the system 50 may be varied according to the design criteria of a particular implementation.

The network 60 may enable communication between the various components of the system 50. In an example, the network 60 may be the internet and/or a wide area network. Some of the components of the system 50 may communicate with the internet 60 wirelessly. Some of the components of the system 50 may communicate with the internet via a hard-wired connection.

The subscriber devices 110a-110n and/or the user communication devices 112a-112n may be configured to execute computer readable instructions (e.g., executable programs, apps, binaries, etc.). For example, the subscriber devices 110a-110n and/or the user communication devices 112a-112n may be implemented as a desktop computer, a laptop computer, a netbook computer, a tablet computing device, a phablet computing device, a smartphone, a smartwatch, smart clothing (e.g., clothing with LTE communication built in), human implantable devices (e.g., a computer chip embedded under the skin), etc. In an example, the subscriber devices 110a-110n and/or the user communication devices 112a-112n may be implemented as a vehicle capable of 3G/4G/LTE/5G communication (e.g., a vehicle with a touchscreen infotainment system). Generally, the subscriber devices 110a-110n and/or the user communication devices 112a-112n may be a device capable of data transmission to the network 60 and may comprise a display, a processor, a memory, an input (e.g., mouse, keyboard, touchscreen, voice recognition, etc.) and/or an output (e.g., a display, haptic feedback, a speaker, etc.). In some embodiments, the subscriber devices 110a-110n and/or the user communication devices 112a-112n may have similar implementations. For example, the user communication devices 112a-112n may be wireless communication devices. The type and/or features of the subscriber devices 110a-110n and/or the user communication devices 112a-112n may be varied according to the design criteria of a particular implementation.

Each of the subscriber devices 110a-110n may be configured to connect to the network 60 (e.g., hard-wired, Wi-Fi, etc.). The subscriber devices 110a-110n may be configured to store and/or execute the computer readable instructions 114a-114n. Executing the computer readable instructions 114a-114n may enable the subscriber devices 110a-110n to display various interfaces, generate output and/or receive input. For example, the app 114a may be a front-end for interacting with the system 50.

Each of the capture devices 100a-100n may be configured to capture video data. In some embodiments, the capture devices 100a-100n may be implemented as vehicle-mounted cameras (e.g., dashcams) to record video while a user drives the vehicle. In one example, each vehicle may be equipped with one of the capture devices 100a-100n. In another example, one vehicle may be equipped with more than one of the capture devices 100a-100n (e.g., to capture multiple fields of view and/or perspectives from the vehicle). In some embodiments, the capture devices 100a-100n may be cameras mounted at stationary locations (e.g., security cameras mounted on buildings). For example, the stationary camera may generate metadata used to determine roadway data. The implementation of the capture devices 100a-100n may be varied according to the design criteria of a particular implementation.

In some embodiments, the capture devices 100a-100n may be configured to communicate directly with the network 60. For example, the capture devices 100a-100n may comprise components implementing Wi-Fi communication and/or 3G/4G/LTE/5G (e.g., cellular) communication. In some embodiments, the capture devices 100a-100n may be configured to communicate indirectly with the network 60. For example, the capture devices 100a-100n may comprise short-range communication such as Bluetooth and/or Wi-Fi (e.g., short-range communication to a tethered device such as a smartphone). A cost of manufacturing the capture devices 100a-100n may be reduced if no 3G/4G/LTE/5G is implemented. A 3G/4G/LTE/5G connection further adds costs for the user since 3G/4G/LTE/5G generally involves a subscription to a carrier (and potential data usage penalties). For example, a cost of the capture devices 100a-100n may be lower when Bluetooth alone and/or Bluetooth/Wi-Fi is implemented compared to a camera that implements 3G/4G/LTE/5G hardware. Implementing the capture devices 100a-100n with a low cost may enable users to buy more than one of the capture devices 100a-100n and/or provide a larger user base. When the system 50 has more of the capture devices 100a-100n available to capture video data and/or provide metadata, more data points may be available for analysis. Generally, having more data points enables more useful analytical results generated by the system 50. In some embodiments, the capture devices 100a-100n may comprise a display and/or an input interface. For example, the capture devices 100a-100n may be configured to run apps (e.g., the computer executable instructions 114a-114n). In another example, the capture devices 100a-100n may be implemented as smartphones configured as cameras.

Each of the user communication devices 112a-112n may be configured to connect to the network 60 and/or the capture devices 100a-100n. In one example, the user communication devices 112a-112n may implement wireless communication devices. The user communication devices 112a-112n may comprise components configured to implement a wide area network connection (e.g., Wi-Fi) and/or local, device-to-device connections (e.g., Bluetooth, ZigBee, Z-Wave, etc.). For example, the user communication devices 112a-112n may implement a Wi-Fi and/or 3G/4G/LTE/5G connection to the internet 60 and a Bluetooth and/or Wi-Fi connection to one or more of the capture devices 100a-100n. In some embodiments, the user communication devices 112a-112n may be configured to send/receive data to/from the internet 60. For example, the user communication devices 112a-112n may receive data (e.g., video data, metadata, etc.) from one or more of the capture devices 100a-100n and transmit the data to the internet 60. In another example, the user communication devices 112a-112n may receive data (e.g., data requests, interrupt requests, firmware updates, etc.) from the internet 60 and transmit the data to the capture devices 100a-100n.

Generally, the user communication devices 112a-112n are implemented as portable devices (e.g., carried by a person, mounted in a vehicle, battery powered, etc.). The user communication devices 112a-112n may be configured to execute the computer readable instructions 114a-114n. In one example, the subscriber devices 110a-110n may store and/or execute one version (e.g., a subscriber version) of an app (e.g., the computer readable instructions 114a) and the user communication devices 112a-112n may store and/or execute another version (e.g., a provider version) of an app (e.g., the computer readable instructions 114b). One of the user communication devices 112a-112n may be configured to communicate with more than one of the capture devices 100a-100n (e.g., one smartphone may connect to multiple vehicle-mounted cameras in the same vehicle). In the example shown, the smartphone 112a communicates with the capture device 100a and the capture device 100b (e.g., the driver may have the smartphone and the vehicle may have two vehicle-mounted cameras). The connections between the user communication devices 112a-112n and/or the capture devices 100a-100n may be varied according to the design criteria of a particular implementation.

Each of the capture devices 100a-100n may comprise a respective block (or circuit) 102a-102n. The circuits 102a-102n may implement video processor functionality. In some embodiments, the circuits 102a-102n may be a system-on-chip (SoC). For example, the circuits 102a-102n may comprise input/output, a memory, processors, etc. The components and/or functionality of the circuits 102a-102n may be varied according to the design criteria of a particular implementation.

The circuits 102a-102n may be configured to record, encode, decode, transmit and/or store video data. The circuits 102a-102n may be configured to perform video analysis and/or video analytics. For example, the circuits 102a-102n may process video, identify patterns in the video data and/or recognize objects captured by the video data. Heuristics, templates and/or comparisons may be performed by the circuits 102a-102n to recognize and/or identify objects in captured video frames (e.g., video data) as objects that can be perceived by humans. In one example, the circuits 102a-102n may identify an object as a vehicle (or part of a vehicle such as a hood, a license plate, etc.). In another example, the circuits 102a-102n may identify text, shapes and/or colors. In yet another example, the circuits 102a-102n may identify objects (e.g., signs, pedestrians, street lights, etc.). The video data captured by the circuits 102a-102n may be stored by the capture devices 100a-100n. In one example, the circuits 102a-102n may implement a memory. In another example, the circuits 102a-102n may connect to an external memory (e.g., the capture devices 100a-100n may be configured to receive a flash memory such as a SD card, a microSD card, NAND memory, Compact Flash (CF) and/or an XD card).

The circuits 102a-102n may be configured to extract metadata from the captured video frames. The metadata may comprise information about objects detected in the video frames by the video analysis. The metadata may comprise information about the video data (e.g., a time the video was recorded, the model number of the camera recording the video, a location that the video was captured based on GPS information, an altitude that the video was recorded, a direction of the capture device while capturing the video data, etc.). For example, the circuits 102a-102n may comprise a GPS unit to determine GPS coordinates, a magnetometer to determine direction of travel and/or a real time clock (RTC) circuit to determine time.

The circuits 102a-102n may be configured to detect license plates. License plates may be detected, and the alphanumeric characters and/or symbols on the license plate may be identified. The license plate alphanumeric characters and/or symbols may be extracted from the captured video data as the metadata. For example, the circuits 102a-102n may detect, and store as metadata, the license plate alphanumeric characters and/or symbols, and store the license plate alphanumeric characters and/or symbols, the time the video was recorded, the longitude coordinate, the latitude coordinate, an altitude value, time of capture and/or the direction of the capture devices 102a-102n when the video was recorded. The circuits 102a-102n may be further configured to analyze the video data to extract metadata such as a make of a vehicle, a model of a vehicle, color(s) of a vehicle, number of pedestrians, number of vehicles and/or roadway characteristics (e.g., road condition, weather condition, traffic signals present, state of traffic signals, road signs present, amount of traffic, flow of traffic, etc.). The metadata may be associated with the corresponding video data. For example, each video clip captured may be assigned an identification number and the metadata associated with the video clip may have the identification number.

The server 120 may be configured to store data, retrieve and transmit stored data, process data and/or communicate with other devices. In an example, the server 120 may implement a metadata server. The server 120 may be implemented as part of a cloud computing platform (e.g., distributed computing). In an example, the server 120 may be implemented as a group of cloud-based, scalable server computers. By implementing a number of scalable servers, additional resources (e.g., power, processing capability, memory, etc.) may be available to process and/or store variable amounts of data. For example, the server 120 may be configured to scale (e.g., provision resources) based on demand. The server 120 may implement scalable computing (e.g., cloud computing). The scalable computing may be available as a service to allow access to processing and/or storage resources without having to build infrastructure (e.g., the provider of the system 50 may not have to build the infrastructure of the server 120).

The server 120 may be configured to execute computer readable instructions. In an example, the server 120 may process HTML, CSS, JavaScript, PHP, SQL, AJAX applications, APIs, etc. The server 120 may be configured to distribute apps (e.g., one or more of the computer readable instructions 114a-114n) to the subscriber devices 110a-110n and/or the user communication devices 112a-112n. The server 120 may be configured to generate interfaces (e.g., graphical user interfaces) based on stored data for the subscriber devices 110a-110n. For example, the server 120 may generate data to implement an interface, the data may be sent to the subscriber devices 110a-110n, the subscriber devices 110a-110n may interpret the data to generate a user interface, the user may interact with the user interface to provide requests, the subscriber devices 110a-110n may transmit the requests to the server 120 and the server may process the requests. Similarly, the capture devices 100a-100n and/or the user communication devices 112a-112n may interpret data from the server 120 to implement an interface. The processing capabilities and/or functionality of the server 120 may be varied according to the design criteria of a particular implementation.

The server 120 may comprise a block (or circuit) 120. The circuit 120 may implement a database (e.g., a remote database). The database 130 may store data and/or filter the stored data in response to search parameters. Details of the database 130 may be described in association with FIG. 2. Generally, the database 130 may store data provided by the capture devices 100a-100n. In an example, the database 130 may store the metadata. Search parameters may be transmitted by the subscriber devices 110a-110n and the database 130 may be searched based on the search parameters. For example, the database 130 may enable the metadata to be associated with the video data stored by (and located on) the capture devices 100a-100n.

The system 50 may be configured to provide a searchable, real time database of roadway video. In an example, the system 50 may be implemented to assist in time-critical challenges (e.g., AMBER alerts, roadway crime, asset recovery, auto insurance investigation, etc.). The system 50 may implement a "Big Data" approach to providing and/or searching captured video and/or metadata.

The system 50 may be implemented using inexpensive cameras 100a-100n to program participants (e.g., the users and/or the data producers). The data producers may install the capture devices 100a-100n. For example, the data producers may install the capture devices 100a-100n on vehicles as dashcams. The capture devices 100a-100n may provide the benefits of a security camera and/or a dashboard camera to the data producers (e.g., security, video evidence, video data for uploading to video services such as YouTube, etc.). In some embodiments, the system 50 may determine an amount of video recorded and provide rewards (e.g., perks) to the data producers (e.g., discounts on the capture devices 100a-100n).

The data producers may use the capture devices 100a-100n to collect and/or upload video metadata to the server 120 (e.g., for storage in the database 130). For example, the video metadata may be uploaded via the user communication devices 112a-112n. The data producers may provide the recorded video to the server 120 on demand. The data producers may be compensated on an ongoing basis for providing the video metadata and/or the recorded video. In one example, the data producer may receive a payment for providing and/or making a pre-determined amount of recorded video available. In another example, the data producer may receive a payment each time one of the video recordings is requested.

The video metadata may be accumulated in the remote database 130. For example, the database 130 may be curated. The video metadata may be made available through a web interface to subscribers (e.g., the data consumers). The subscribers may use the subscriber devices 110a-110n to access the database 130. The database 130 and/or the server 120 may enable the subscribers to search the database 130 using search parameters. In one example, the interface may provide a map overlay (e.g., based on data presented by the server 120) that the subscriber may interact with on the subscriber devices 110a-110n to provide the search parameters. In another example, the subscriber may specify search parameters such as a location, a time of an incident and/or license plate data. The database 130 may perform a search of the metadata to determine whether any of the video metadata matches the search parameters.

The database 130 may provide the search results. The interface generated on the subscriber devices 110a-110n may provide the subscriber with a list of videos that match the search results communicated by the server 120. The subscriber may request available recorded video files for a given event. If a subscriber requests one of the video files, a request may be sent to the server 120. The server 120 and/or the database 130 may determine which of the capture devices 100a-100n captured the video based on the video metadata (e.g., the metadata may comprise an ID of a camera and/or user that captured the video). The server 120 may send a request to the user communication devices 112a-112n and/or the capture devices 100a-100n to upload the recorded video. If the capture devices 100a-100n still have the requested video stored, a video upload may be initiated. The recorded video may be trickled (e.g., uploaded as a low priority data transfer) from the corresponding one of the capture devices 100a-100n, through the corresponding one of the user communication devices 112a-112n and to the internet 60. In some embodiments, the recorded video may be buffered on one of the user communication devices 112a-112n until particular conditions are met for uploading the video recording (e.g., until a Wi-Fi connection is available). The server 120 may notify the subscriber that the video is available for download. An account of the data producer that uploaded the video may be credited in response to the video upload.

The system 50 may enable data provider users to access the database 130. The data provider users may feed the database 130 in real time with video metadata. The system 50 may enable the subscriber users to search the database 130. When the database 130 determines there is a hit for a search request, the system 50 may allow the subscriber to get access to the video metadata and/or the video recording.

The capture devices 100a-100n may be implemented with inexpensive hardware powerful enough to perform video analytics (e.g., license plate recognition (LPR)). The video analytics may be performed in real time, while capturing the video data. In one example, the capture devices 100a-100n may be sold with a low margin to encourage wide adoption of the device so that many users may be the data providers to capture large amounts of video data for the system 50. Since data providers may be compensated for providing the video data and/or video metadata, the data providers may have the ability to turn the capture devices 100a-100n into a money making tool. For example, in the system 50 the drivers may own the capture devices 100a-100n and use them to make money (e.g., similar to how an Uber, Lyft or other ridesharing service drivers own a vehicle and use the vehicle to make money).

The database 130 may be implemented to receive video metadata, index the metadata and/or provide responses to search requests in real time. In some embodiments, the database 130 may store video recordings. Generally, the video metadata (e.g., plate number, GPS coordinates, time, etc.) is uploaded via the user communication devices 112a-112n without the corresponding recorded video (e.g., the metadata may be uploaded before the video data is uploaded). If one of the subscriber users requests a recorded video file corresponding to the video metadata, the system 50 may enable the video data to be uploaded to the metadata server 120 (e.g., data may be uploaded as a low-priority data transfer). The recorded video data may have a limited time frame of availability. In one example, the capture devices 100a-100n may be configured to overwrite stored video as new video data is captured (e.g., a loop recording). In an example of 40 hours of driving per week with the capture devices 100a-100n implementing a 128 GB SD card and recording at 10 Mbit/s, the recorded video may be overwritten in approximately 3.5 days. When a video expires (e.g., is overwritten), the video metadata stored in the database 130 may still provide useful information to the subscriber user (e.g., which vehicles were in a particular area at a particular time).

The video metadata and/or the recorded video may provide useful information to the subscriber users. In one example, the system 50 may be helpful in an AMBER Alert situation. In another example, video evidence may be provided to insurance companies involved with a given auto accident. Different viewpoints and/or camera angles may be used to determine the circumstances that led up to an accident. In yet another example, the system 50 may save many government agencies (e.g., Department of Transportation) a tremendous amount of money in planning infrastructure (e.g., to limit infrastructure development and/or expand infrastructure development based on driving habits). In still another example, the system 50 may provide investigative departments (e.g., Department of Justice, local police, highway patrol, homeland security, etc.) with more information (e.g., post-mortem incident investigation).

Generally, the provider of the system 50 may not capture any video data. The video data may be captured by the data providers that have purchased (or otherwise received) the capture devices 100a-100n. The provider of the system 50 may curate the resulting data generated by the data providers.

Figure 2:
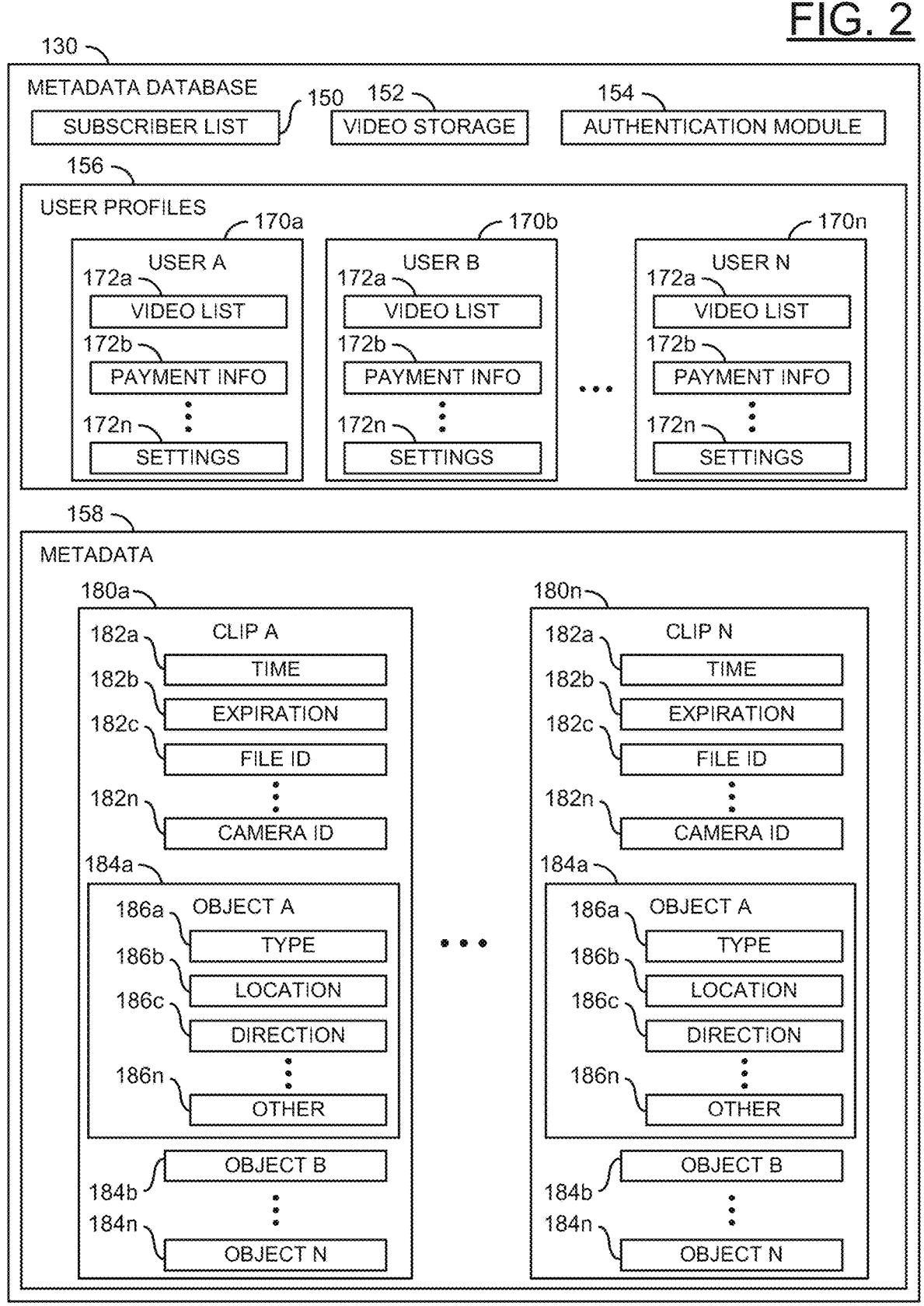
FIG. 2 is a diagram illustrating a block diagram representing data sets stored in a database.

Referring to FIG. 2, a diagram illustrating a block diagram representing example data sets stored in the database 130 is shown. The database 130 may comprise a block (or circuit) 150, a block (or circuit) 152, a block (or circuit) 154, a block (or circuit) 156 and/or a block (or circuit) 158. The block 150 may comprise a subscriber list. The block 152 may comprise video storage. The block 154 may comprise an authentication module. The block 156 may comprise user profiles. The block 158 may comprise plate and/or object metadata. The database 130 may comprise other blocks (or data sets). The implementation of the database 130 may be varied according to the design criteria of a particular implementation.

The subscriber list 150 may be configured to store information about the subscriber users. The subscriber list 150 may provide an account for each subscriber user. For example, a log in with password may be implemented by the app 114a to enable the subscriber user to access the database 130 from the subscriber device 110a. The subscriber list 150 may enable the system 50 to accept payment from subscriber users that request video data (e.g., store payment information, process payment information, etc.). The subscriber list 150 may implement individual settings, configurations and/or notifications for each of the subscriber users.

The video storage 152 may store recorded video data. In some embodiments, the data providers may upload the recorded video data to the database 130 when requested by the subscriber users. The database 130 may provide storage (e.g., temporary hosting) of the recorded video data to enable the subscriber user to download the requested video data. In some embodiments, peer-to-peer data transfers may be implemented to share the recorded video data (e.g., the database 130 may not store the recorded video data). Generally, the recorded video uploaded from the capture devices 100a-100n may be stored by the server 120.

The authentication module 154 may be configured to provide security for the data stored in the database 130. The authentication module 154 may be configured to prevent unauthorized access to the database 130. In one example, the authentication module 154 may be implemented as a username and password. For example, the user communication devices 112a-112n may provide credentials to the database 130 to upload the video metadata and/or the recorded video. In another example, two-factor authentication may be implemented by the authentication module 154. For example, the subscriber user may log in using the subscriber devices 110a-110n by providing a username, a password, and an additional key (e.g., a text message with a passcode provided to the smartphone 110a). The implementation of the authentication module 154 may be varied according to the design criteria of a particular implementation.

For example, users on the subscriber list 150 may be authorized users of the database 130. Generally, not all users have access to the database 130. The authentication module 154 may implement a heavy layer of security for the subscriber users and/or the data provider users to log onto the system 50. Since the database 130 may store privacy information (e.g., license plate data, location information, credit card information, banking information, etc.) the database 130 may be secured with a traditional approach and then have a second layer of security added. Security may be provided even if the implementation of the authentication module 154 adds inconvenience to the users.

The user profiles 156 may store data corresponding to the data provider users. The user profiles 156 may comprise blocks (or circuits) 170a-170n. The blocks 170a-170n may comprise the data provider profiles. Each of the data provider profiles 170a-170n may store information corresponding to an individual data provider. Each of the data provider profiles 170a-170n may comprise blocks (or circuits) 172a-172n. The blocks 172a-172n may be configured to store data sets for the data providers 170a-170n.

The data sets 172a-172n may facilitate access to the database 130 for each of the data provider users. In an example, the data set 172a may store a video list. The video list 172a may comprise a list of videos that have been recorded by a particular data provider. For example, the video list 172a may be used to send a request to the capture devices 100a-100n and/or the user communication devices 112a-112n to upload the recorded video data. In another example, the video list 172a may be used to provide a payment to the particular data provider that captured the requested video data. In an example, the data set 172b may store payment information. The payment information 172b may associate credit card, electronic payment (e.g., PayPal, Bitcoin, Apple Pay, Google Wallet, etc.) and/or bank information with a particular one of the data provider users. The payment information 172b may be used to facilitate payments to the data provider that has uploaded a requested recorded video.

In some embodiments, the data provider may receive one of the capture devices 100a-100n in exchange for providing the payment information 172b and if enough video data is provided (e.g., provided on a consistent basis) the data collector user may not be charged. If the capture device is not used enough (or not used regularly), a charge may be incurred (e.g., due to inactivity). In an example, the data provider may receive one of the capture devices 100a-100n free of charge and be able to use the camera as a regular dashcam as well as for providing data for the system 50. In one example, the data provider may not be charged for one of the capture devices 100a-100n for the first 90 days and if data is provided to the system 50 during the first 90 days no charge will be incurred. To avoid a situation where a freeloader receives the camera for free and uses the camera with the system 50 for a minimum threshold amount to avoid a fee and then stops providing data to the system 50, the payment information 172b may be stored to charge a penalty fee to encourage the data provider to provide data.

In an example, the data set 172n may comprise user settings. The user settings 172n may provide a configuration and/or preferences for each of the data providers 170a-170n. The data sets 172a-172n may store other information (e.g., a user name, a profile picture, a data usage plan of the data provider, etc.). In an example, the data usage plan may provide details of a carrier (e.g., 3G/4G/LTE/5G provider) to manage data transmission (e.g., prefer transferring large files over Wi-Fi instead of a limited data plan). The amount and/or type of data stored in the data sets 172a-172n of each of the data provider profiles 170a-170n may be varied according to the design criteria of a particular implementation.

The metadata 158 may store information about various captured videos (e.g., video clips) 180a-180n. The video clips 180a-180n may not be the actual video data (e.g., the actual video data may be stored with the video storage 152). The video clips 180a-180n may comprise information about the video clips and/or information about objects detected in the video clips by the capture devices 100a-100n.

In some embodiments, each video clip metadata 180a-180n that is captured and/or uploaded by the capture devices 100a-100n may be stored by the database 130. The video data associated with the video clip metadata 180a-180n may be stored in the video storage 152. Generally, the video data in the video storage 152 may be stored temporarily. For example, video data may have a relatively large file size and storing video data indefinitely may be impractical. However, the video clip metadata 180a-180n may have a much smaller file size than the video data. The video clip metadata 180a-180n may be configured to provide sufficient information about the video data to re-create the positioning of various objects in the video data even after the video data is no longer available.

Every time video data is uploaded to the database 130, the corresponding video metadata 180a-180n may be stored by the database 130. The video metadata 180a-180n may be stored long-term compared to the video data. In some embodiments, the metadata 158 may be organized by detected objects instead of the video clip metadata 180a-180n. In one example, where the objects detected are license plates, each time a license plate is detected a new metadata entry may be created. For example, each of the license plate entries may comprise the associated clips 180a-180n. The clips 180a-180n may comprise metadata entries for each time a license plate has been read by one of the capture devices 100a-100n. For example, each time a license plate is detected, a new one of the clips 180a-180n may be appended to the corresponding one of the license plate entries. Similarly, if the objects detected are vehicles then the video clips 180a-180n may be associated with a particular vehicle. The arrangement of the metadata 158 may be varied according to the design criteria of a particular implementation.

Each video clip 180a-180n is shown comprising metadata 182a-182n. The clip metadata 182a-182n may comprise the data extracted by the capture devices 100a-100n from the video recorded by the capture devices 100a-100n and/or data associated with the video recorded by the capture devices 100a-100n. The video clip metadata 182a-182n may be configured to provide useful information about the video clips that have been uploaded.

In one example, the video clip metadata 182a may comprise a time. The time 182a may indicate a date and/or time of day when the corresponding video was recorded (e.g., a timestamp). The time 182a may be used to find recorded video that occurred at a particular time. In another example, the video metadata 182b may comprise an expiration flag. The expiration flag 182b may indicate whether or not the recorded video is still available (e.g., stored in the memory of the capture device, stored in the video storage 152, has not been overwritten, etc.). For example, the expiration flag 182b may have a particular value (e.g., a logical one value) if the video has been overwritten. If the expiration flag 182b indicates that the recorded video is no longer available, the video clip metadata 180a-180n may still provide useful information. The video clip metadata 182c may provide a file ID. The file ID 182c may be used to associate the video clip metadata 180a-180n to a particular stored video file (e.g., either in the video storage 152 and/or in the memory of the cameras 100a-100n). For example, if the expiration flag 182b indicates the video data is still available then the file ID 182c may be used to retrieve the video data. The video clip metadata 182n may provide a camera ID. The camera ID 182n may be used to associate the video clip metadata 180a-180n to a particular one of the cameras 100a-100n (e.g., the camera that captured the video data associated with the metadata). The camera ID 182n may enable the video data to be retrieved from the capture devices 100a-100n (if the video is still available) and/or to enable the data provider to be contacted for more information (or provide payment to the data provider user). The number and/or type of video clip metadata 182a-182n available may be varied according to the design criteria of a particular implementation.

The video clip metadata 180a-180n may comprise a number of objects 184a-184n. The objects 184a-184n may correspond to each object detected using the video analysis performed by the capture devices 100a-100n. In one example, the object 184a may be a particular vehicle detected in the video data. In another example, the object 184b may be a particular pedestrian detected in the video data. In yet another example, the object 184c may be a license plate detected in the video data. In still another example, the object 184n may be a particular sign and/or landmark detected in the video data. The number and/or types of objects 184a-184n stored with the video clip metadata 180a-180n may be varied according to the design criteria of a particular implementation.

Each of the objects 184a-184n may have associated object information 186a-186n. In an example, the object information 186a may correspond to an object type (e.g., a person, a vehicle, a building, a sign, a billboard, a license plate, etc.). The object type 186a may provide details about the associated objects 184a-184n. In one example, if the object is a vehicle, the object type 186a may indicate the make, model, year, color, license plate, number of passengers, distinctive markings, etc. The object information 186b may correspond to a location. The location 186b may comprise GPS coordinates corresponding to the object in the recorded video. The location 186b may be used to find recorded video that was captured at a particular location (e.g., at an intersection at a particular time). In some embodiments, the location 186b may comprise an absolute location of the objects 184a-184n. For example, the absolute location 186b may be determined by the video analysis performed by the capture devices 100a-100n to determine the actual coordinates of the objects detected instead of merely the GPS coordinates of the capture devices 100a-100n. In some embodiments, the location 186b may be the location of the object within the video frame (e.g., the distance of the object from the camera lens determined by the capture devices 100a-100n using video analysis).

The object information 186c may comprise a direction. In some embodiments, the direction 186c may indicate the direction of travel of the objects 184a-184n (or if the objects 184a-184n are stationary). For example, the direction 186c may be determined by the capture devices 100a-100n analyzing a sequence of video frames to determine where the object is moving over time. In some embodiments, the direction 186c may be the direction that the capture device 186a-186n was facing when the video data was captured. For example, the information from the location 186b and the direction 186c may be combined to determine the absolute location coordinates of the objects 184a-184n. Other types of metadata 186n may be stored about the objects 184a-184n. The types and/or amount of object information 186a-186n may be varied according to the design criteria of a particular implementation.

The information stored about the video clips 180a-180n may be used to identify vehicles, times, locations and/or other data about the recorded videos. The video clip metadata 180a-180n may be the data checked by the database 130 to determine results for a search query from the subscriber users. The video metadata 180a-180n may be used to approximate what may be recorded and/or visible when viewing the corresponding recorded video. The storage format for the metadata 158 may be implemented to enable re-enact and/or re-creating a scene (e.g., the vehicle locations) after the video data has expired (e.g., re-creating the arrangement of the objects when the video data is no longer available).

The circuits 102a-102n may be configured to perform object detection and/or video analysis to determine and/or recognize details of an object (e.g., of objects other than license plates). For example, in some video scenes, license plates may not be visible (e.g., the license plate is obstructed and/or not clear enough for optical character recognition). The circuits 102a-102n may be configured to determine roadway data in real time. In one example, the object information 186a-186n may store information corresponding to a type of vehicle detected (e.g., color of a car, make of a vehicle, model of a vehicle, year of a vehicle, speed of a vehicle, etc.). In another example, the object information 186a-186n may comprise roadway data (e.g., a lamp post detected, a street sign detected, a shape of a roadway detected, conditions of the road detected, etc.).

The database 130 may be configured to index the video metadata and/or associate new video metadata with license plate numbers and/or objects in real time. The database 130 may arrange the data to enable efficient filtering of information to provide fast search results for the subscriber users. In the example shown, the metadata 158 is arranged according to the video clips 180a-180n. In another example, the metadata 158 may be arranged based on a time, a location, a camera ID, etc.). The arrangement of the storage of the data in the database 130 may be varied according to the design criteria of a particular implementation.

The database 130 may be configured to create a database entry for each incoming video clip. In one example, the video metadata 182a-182n for the clip 180a may comprise information such as id="1", lp="5SAM333", date="20170307", time="14:30", alt="141.46354", lat="37.804440" and/or lng="-122.422874". In another example, the video metadata 182a-182n for the clip 180i may comprise information such as id="2", lp="5SAM333", date="20170307", time="14:32", alt="142.13576", lat="37.804643" and/or lng="-122.420899". The database 130 may receive a large amount of data collected from various data provider users in a short amount of time. The database 130 may be constantly (e.g., continually, regularly, periodically, etc.) sorting the received data in order to serve up results to the subscriber users on the web interface. For example, the database may implement one file for each license plate 180a-180n to avoid parsing all stored data in order to filter out license plate results in real time.

Figure 3:
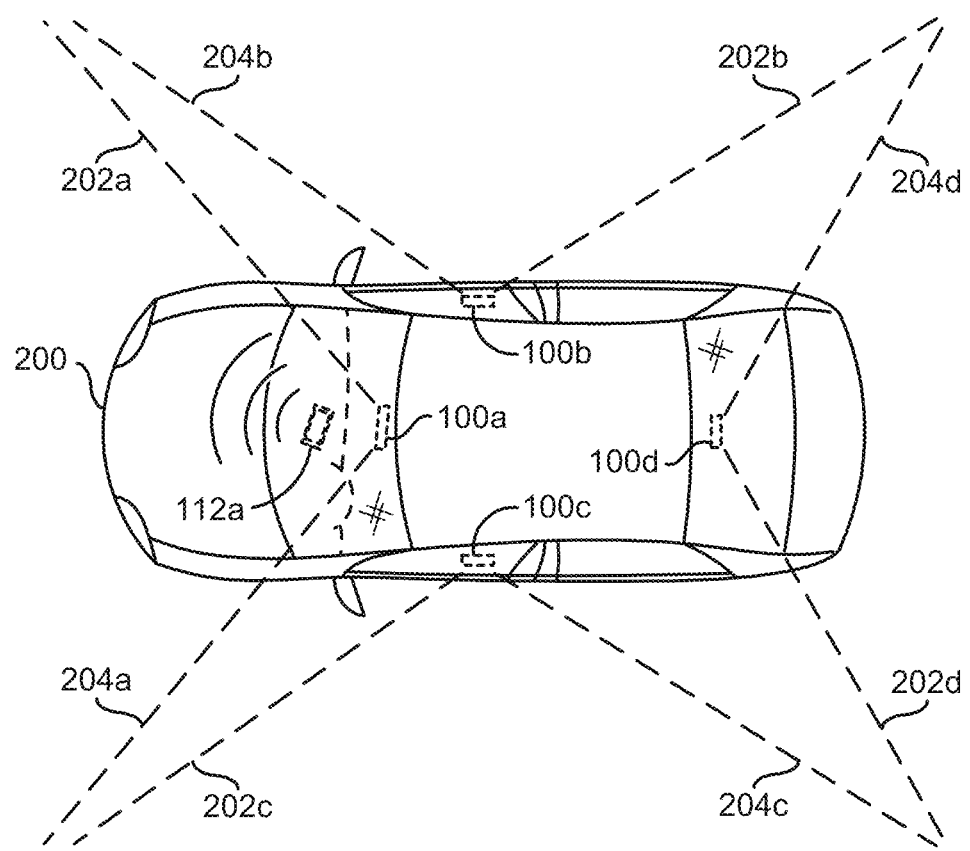
FIG. 3 is a diagram illustrating capturing video data from vehicle-mounted cameras.

Referring to FIG. 3, a diagram illustrating capturing video data from vehicle-mounted cameras is shown. A vehicle 200 is shown. The vehicle 200 may be a vehicle of a data provider (e.g., a data provider vehicle). The vehicle 200 may comprise a number of the capture devices 100a-100n. In the example shown, the capture device 100a may be installed facing the direction of travel of the vehicle 200, the capture device 100b may be installed directed away from a passenger side of the vehicle 200, the capture device 100c may be installed directed away from a driver side of the vehicle 200 and the capture device 100d may be installed directed facing opposite from the direction of travel of the vehicle 200.

The user communication device 112a is shown in the vehicle 200. In the example shown, the user communication device 112a may be a smartphone communicating to the network 60 (e.g., via a 3G/4G/LTE/5G wireless connection). For example, each of the installed cameras 100a-100d may communicate with the smartphone 112a (e.g., creating a local network) and the smartphone 112a may communicate with the external network 60. In the example shown, the capture devices 100a-100d may be positioned on the windows of the front, side and back of the vehicle 200 (e.g., suction cupped from the inside of the vehicle 200). The number, installation and/or locations of the capture devices 100a-100n in a vehicle may be varied according to the design criteria of a particular implementation and/or a preference of the data provider.

A line 202a and a line 204a are shown extending from the capture device 100a. The line 202a and the line 204a may represent a field of view captured by the capture device 100a. The field of view of the capture device 100a may record video of a view from the front of the vehicle 200 (e.g., from a perspective of a front of the vehicle 200). A line 202b and a line 204b are shown extending from the capture device 100b. The line 202b and the line 204b may represent a field of view captured by the capture device 100b. The field of view of the capture device 100b may record video of the view from the right of the vehicle 200 (e.g., from a perspective of a passenger side of the vehicle 200). A line 202c and a line 204c are shown extending from the capture device 100c. The line 202c and the line 204c may represent a field of view captured by the capture device 100c. The field of view of the capture device 100c may record video of the view from the left of the vehicle 200 (e.g., from a perspective of a driver side of the vehicle 200). A line 202d and a line 204d are shown extending from the capture device 100d. The line 202d and the line 204d may represent a field of view captured by the capture device 100d. The field of view of the capture device 100d may record video of the view from the rear of the vehicle 200 (e.g., from a perspective of a back of the vehicle 200).

The vehicle 200 may have a number of the capture devices 100a-100n installed. In the example shown, four of the capture devices 100a-100n may be installed. For example, the cameras may be directed for a "drive mode" (e.g., the camera 100a directed forward, and the camera 100d directed backwards) and the cameras may be directed for a "trawl mode" (e.g., the camera 100b and the camera 100c each directed sideways). For example, the trawl mode may be useful when in parking lots. The number of the capture devices 100a-100n installed on the vehicle 200 may be varied according to the design criteria of a particular implementation.

Figure 4:
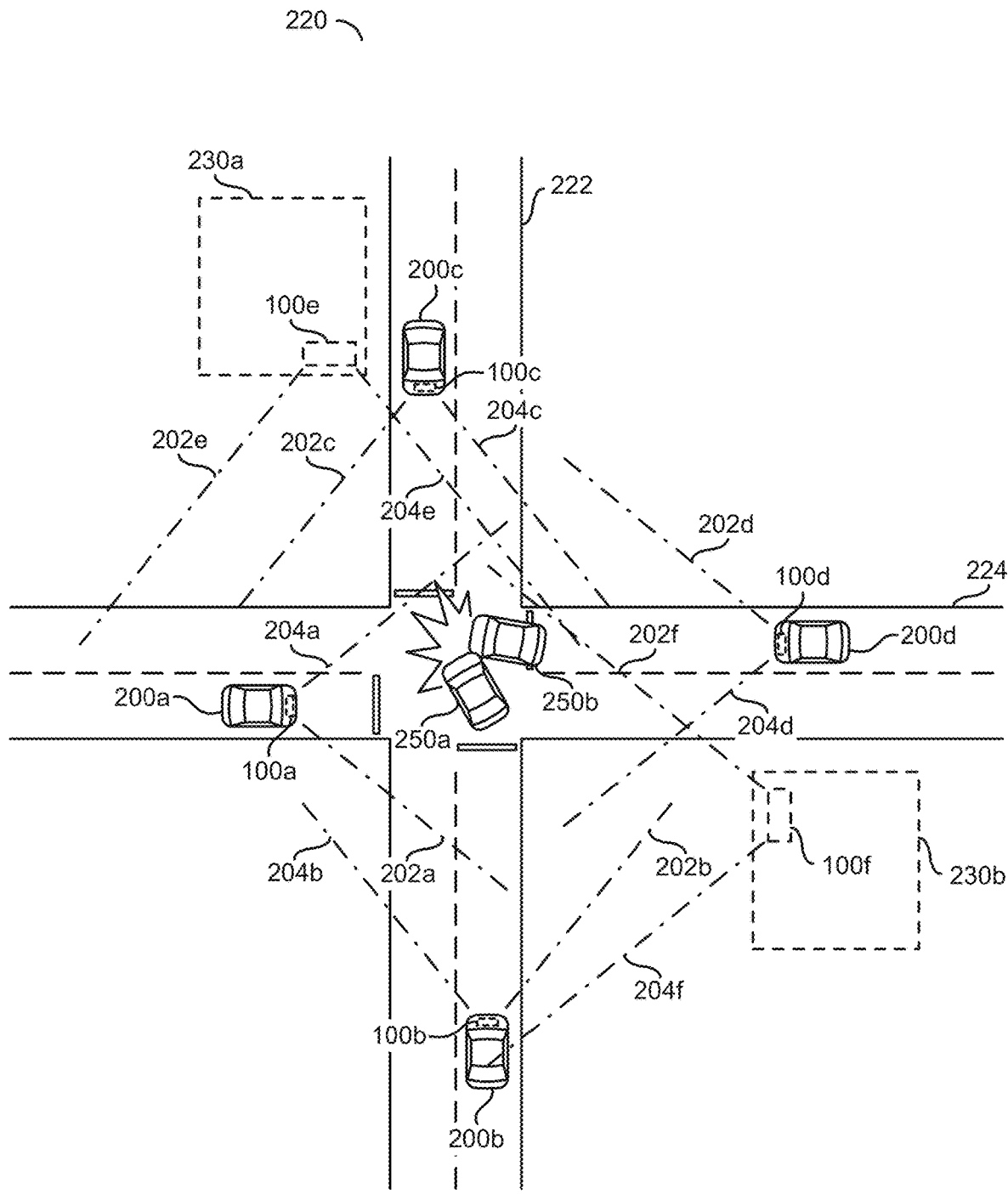
FIG. 4 is a diagram illustrating multiple vehicles capturing video footage of an event.

Referring to FIG. 4, a diagram illustrating multiple vehicles capturing video footage of an event 220 is shown. The event 220 may be a collision at an intersection of a road 222 and a road 224. A vehicle 250a and a vehicle 250b are shown colliding. The drivers of the vehicle 250a and the vehicle 250b may use the system 50 as subscriber users. For example, the subscriber users that drive the vehicle 250a and the vehicle 250b (or insurance companies representing the drivers of the vehicle 250a and/or the vehicle 250b to determine fault) may want video evidence from different viewpoints of the collision (e.g., to aid in resolving insurance claims that may arise as a result of the event 220).

The vehicle 200a may have the capture device 100a installed, the vehicle 200b may have the capture device 100b installed, the vehicle 200c may have the capture device 100c installed and/or the vehicle 200d may have the capture device 100d installed. The drivers of the vehicle 200a, the vehicle 200b, the vehicle 200c and/or the vehicle 200d may be data providers. A building 230a and a building 230b are shown. The building 230a may have the capture device 100e installed and the building 230b may have the capture device 100f installed as a security camera. In some embodiments, one or more of the capture devices 100a-100n may be implemented as stationary cameras. The owner of the building 230a and the owner of the building 230b may be data providers for the system 50 (e.g., capture video of the event 220).

The capture device 100a may capture one field of view (e.g., the line 202a and the line 204a) from the viewpoint of the vehicle 200a. The capture device 100b may capture one field of view (e.g., the line 202b and the line 204b) from the viewpoint of the vehicle 200b. The capture device 100c may capture one field of view (e.g., the line 202c and the line 204c) from the viewpoint of the vehicle 200c. The capture device 100d may capture one field of view (e.g., the line 202d and the line 204d) from the viewpoint of the vehicle 200d. The capture device 100e may capture one field of view (e.g., the line 202e and the line 204e) from the viewpoint of the building 230a. The capture device 100f may capture one field of view (e.g., the line 202f and the line 204f) from the viewpoint of the building 230b. The various fields of view may provide video metadata and/or video recordings from different viewpoints.

The database 130 may receive metadata corresponding to the video data captured by the capture devices 100a-100f of the event 220. For example, the database 130 may receive six different user IDs of the data provider users. The database 130 may receive six slightly different GPS coordinates corresponding to the different locations of the cameras 100a-100f. In some embodiments, the database 130 may receive the same timestamp from each of the capture device 100a-100f. In some embodiments, the timestamp may be slightly different because the video files may be stored as video clips having a pre-determined time (e.g., 2 minute video clips) and the start and end time of each video clip may depend on when the cameras 100a-100f were booted up (e.g., when the vehicles 200a-200d were started). In some embodiments, system 50 may be configured to synchronize the time on each of the capture devices 100a-100n (e.g., to ensure the timestamp for a start and end time of each video clip matches between the capture devices 100a-100n). The database 130 may receive up to 6 different direction metadata information. In some embodiments, multiple clips 180a-180n with metadata information 182a-182n and/or object information 186a-186n for each object detected may be received (e.g., depending on the length of the event 220).

The video metadata from each of the cameras 100a-100f may be uploaded to the database 130. Since two vehicles (e.g., 250a-250b) are in the car accident, the database 130 may associate at least the objects 184a-184b with two license plates and/or vehicle type entries (e.g., 184a for the vehicle 250a and 184b for the vehicle 250b). Depending on the fields of view, some of the cameras 100a-100n may not capture both license plates and/or vehicles (e.g., the field of view of the camera 100b may capture the license plate of the vehicle 250a but not capture the license plate of the vehicle 250b). License plate entries may be made for the data provider vehicles 200a-200d (e.g., the capture device 100a may capture the license plate of the vehicle 200d). Additional license plate and/or vehicle entries may be made for other objects and/or vehicles captured (e.g., the capture device 100b may capture the colliding vehicles 250a-250b as well as the vehicle 200a).

The metadata 158 may be extracted from the video data captured by each of the capture devices 100a-100n. The video metadata 158 may be associated with the video clips 180a-180n corresponding to each field of view captured. In one example, the video clip 180a may correspond to the metadata associated with the video data captured by the capture device 100a. In another example, the video clip 180b may correspond to the metadata associated with the video data generated by the capture device 100b. In one example, the object 184a may correspond with the vehicle 250a captured by the capture device 100a and associated with the video clip 180a and the object 184b may correspond to the vehicle 250b captured by the capture device 100a and associated with the video clip 180a. In another example, the object 184a may correspond with the vehicle 250b captured by the capture device 100b and associated with the video clip 180b and the object 184b may correspond to the vehicle 250a captured by the capture device 100b and associated with the video clip 180b. The subscriber users may use the subscriber devices 110a-110n (e.g., via the app and/or web interface 114a) to search the metadata 184a-184n to view any videos that may have been captured of the event 220.

In some embodiments, the capture devices 100a-100n may implement Wi-Fi communication (e.g., to transmit the metadata and/or the recorded videos to the network 60). Implementing the Bluetooth communication to transfer data between the capture devices 100a-100n and the user communication devices 112a-112n may be useful in the vehicles (e.g., 200a-200d) to forward metadata and/or recorded videos to the network 60. In some embodiments, the capture devices 100a-100n may implement Wi-Fi functionality to connect to access points that may be fixed (e.g., Wi-Fi hotspots, home networks, business networks, etc.). For example, if someone had a storefront or house that overlooked the intersection (or any field of view where license plate recognition and/or other type of roadway metadata extraction could be performed on passing vehicles), the cameras 100a-100n could be placed to face out a window of a home and/or business (e.g., similar to a consumer IP camera). Connecting the capture devices 100a-100n to a Wi-Fi access point may enable the cameras 100a-100n to operate like a consumer IP Camera but additionally provide the video clip metadata 180a-180n (e.g., by receiving payments from the system 50 in exchange for providing the video metadata, the cost of a security camera for the business may be subsidized). Similarly, a business operating a fleet of vehicles (e.g., taxi drivers, delivery drivers, drivers of a car-sharing company, etc.) may install the capture devices 100a-100n in an existing fleet of vehicles and make a small profit over time by receiving payments from the system 50 by being a data provider (and use the video data like an ordinary dash camera for post mortem analysis of any crash involving a vehicle from the fleet).

If the subscriber user (e.g., the driver of the vehicle 250a, the driver of the vehicle 250b, an insurance company representing the drivers of the vehicles 250a-250b, and/or another user) searches the video clips 180a-180n in the database 130, a list of videos of the event 220 may be provided. If the subscriber user decides to request a video recording of the event, the server 120 may send a request to one or more of the capture devices 100a-100n (or the associated user communication device 112a-112n). The circuits 102a-102n may set a flag for the requested video in response to the request from the server 120. Setting the flag for the requested video may be used to preserve the requested video recording (e.g., prevent the video from being over-written). The capture devices 100a-100n and/or the user communication devices 112a-112n may upload the video data to the server 120. In some embodiments, the associated video may be preserved for all data points that may be returned as search results of a search query. For example, the server 120 may send the request to one or more of the capture devices 100a-100n (or the associated user communication device 112a-112n) to preserve the video data associated with the search results so that the video data may be preserved in order to be made available if the subscriber user later decides to request the video data. The flag may be set for a pre-determined amount of time before the video is unflagged (e.g., to prevent storage of video data indefinitely).

In some embodiments, the video recording may be flagged for preservation in response to a request from a subscriber user. In some embodiments, the system 50 may send a request to all capture devices 100a-100n that have video data from a particular time and a particular location. For example, an event may occur that may be considered important (e.g., a VIP such as a celebrity is at a location, a crime has been committed, a gunshot was reported, a blast was reported, etc.). When a particular event has been determined to have occurred, all cameras 100a-100n in the vicinity may start preserving data. In one example, if the VIP event is happening presently, the video data being currently recorded may be preserved. In another example, the video data currently residing in the memory of the capture devices 100a-100n associated with the time of the event may be preserved (e.g., a crime is reported after the event occurs and later an interrupt request is provided to the capture devices 100a-100n to preserve potential evidence).

In some embodiments, the video metadata 182a-182b and/or the object information 186a-186n associated with each of the objects 184a-184n may enable the event 220 to be re-created, even if the video data is no longer available (e.g., expired, overwritten, etc.). For example, the object information 186a-186n may be used for each of the objects 184a-184n of each of the video clips 180a-180n associated with the event 220 (e.g., based on a timestamp and/or general location) to determine the absolute location of each of the vehicles 200a-200d and/or the colliding vehicles 250a-250b. Even if the video data is no longer available, the object information 186a-186bn may provide detailed absolute coordinate information over a sequence of time. For example, the detailed absolute coordinate information may be used to indicate where each of the colliding vehicles 250a-250b were before, during and after the event 220. For example, by analyzing the absolute location coordinates over a sequence of time, the speed, direction of travel, the timing of the event 220 and/or other information about the colliding vehicles 250a-250b may be determined to re-create the event 220.

Figure 5:
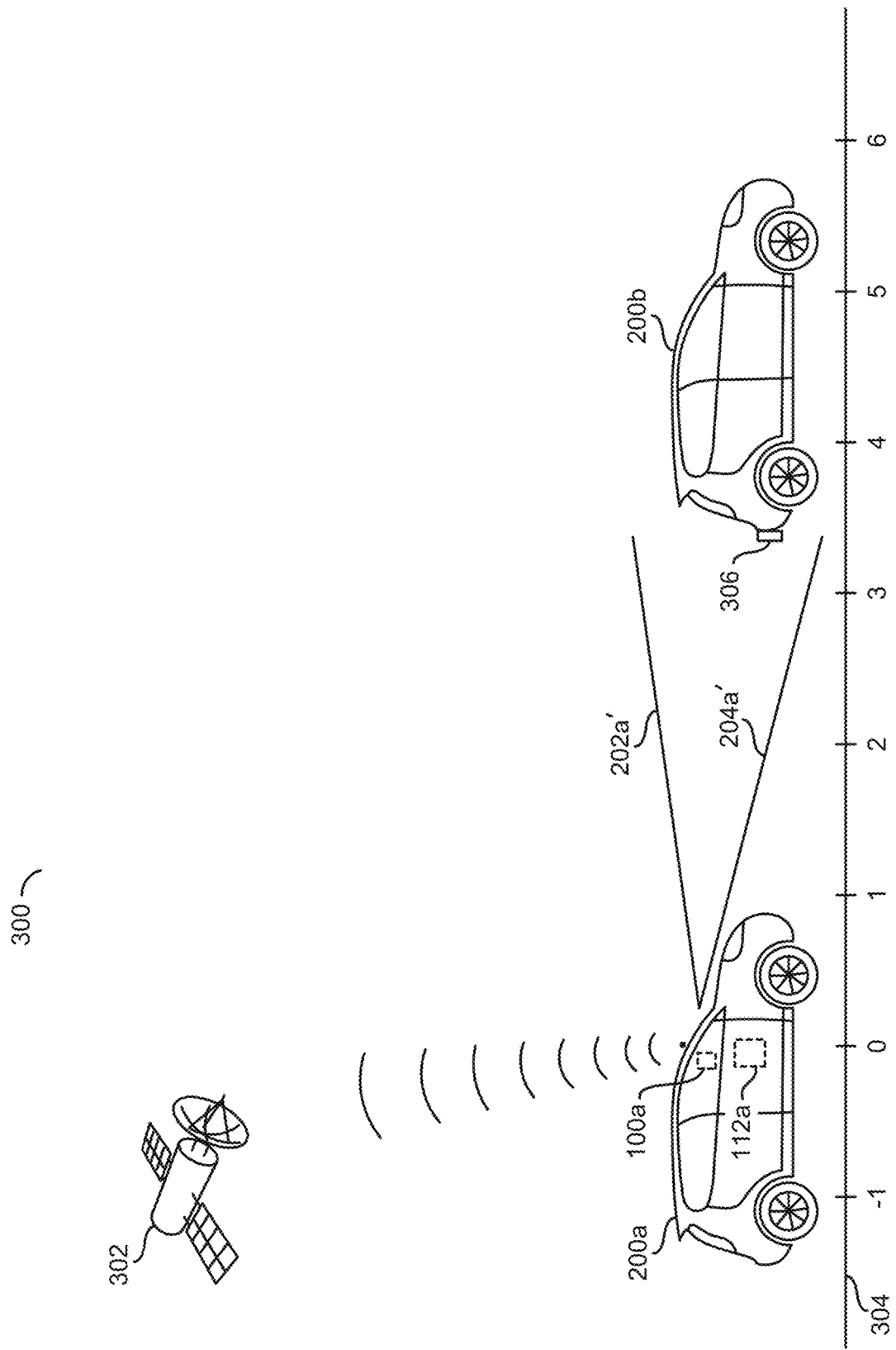
FIG. 5 is a diagram illustrating a vehicle-mounted camera capturing video of another vehicle.

Referring to FIG. 5, a vehicle-mounted camera capturing video of another vehicle is shown. An illustrative scenario 300 is shown. A satellite 302 and a line 304 is shown. Vehicles 200a-200b are shown. In the illustrative scenario 300, the capture device 100a and the user communication device 112a are shown in the vehicle 200a (e.g., the ego vehicle). The line 202a' and the line 204a' may represent a field of view for capturing video by the capture device 100a. A license plate 306 is shown on the vehicle 200b.

The capture device 100a is shown communicating with the satellite 302. The satellite 302 may represent one or more GNSS satellites. For example, while only one satellite 302 is shown, generally for calculating GPS/GNSS location coordinates, the capture device 100a may communicate with at least 3 GPS/GNSS satellites. The capture device 100a may comprise a location device (e.g., a GPS/GNSS module, device and/or circuit). The capture device 100a may be configured to communicate with the GPS/GNSS satellites 302 to receive location data. The capture device 100a may be configured to calculate location coordinates in response to the data received from the GPS/GNSS satellites 302.

Generally, the location coordinates determined by the capture device 100a may correspond to the location coordinates of the capture device 100a (e.g., the location of the vehicle 200a). In the illustrative scenario 300, the line 304 may comprise a scale of distances. The location coordinates determined by the capture device 100a is shown as a reference point of 0 on the line 304. While a reference point of 0 is shown in the illustrative scenario 300, the location coordinates may comprise various measurements (e.g., a latitude coordinate, a longitude coordinate, an altitude value, etc.). The type and/or amount of information in the location coordinates may be varied according to the design criteria of a particular implementation.

In some embodiments, the capture device 100a may take an indeterminate amount of time to communicate and/or receive the location data from the GPS/GNSS satellites 302. For example, when the capture device 100a boots up (e.g., when the vehicle 200a is started), there may be a delay of a couple of minutes before communication with the GPS/GNSS satellites 302 is established (e.g., signal acquisition). In order to have location coordinates available when the capture device 100a is turned on (e.g., without waiting for the communication with the GPS/GNSS satellites 302 to be established), the capture device 100a may temporarily use alternate coordinates.

In one example, the alternate coordinates may be received from the user communication device 112a. For example, the user communication device 112a may be a GPS-enabled smartphone and since the smartphone 112a may have already calculated the GPS coordinates, the GPS coordinates calculated by the smartphone 112a may be used as the alternate coordinates (e.g., communicated to the capture device 100a using the short-range (e.g., Bluetooth) communication). Furthermore, the alternate coordinates communicated by the smartphone 112a may be used to supplement and/or enhance the location coordinates determined by the capture device 100a. In one example, the location functionality of smartphones may become increasingly advanced (e.g., cell tower triangulation, location based on Wi-Fi networks, social media app check-ins, other location services, etc.) and may be used to provide additional precision to the location coordinates determined by the capture device 100a. The type of additional and/or alternate coordinates provided by the user communication device 112a may be varied according to the design criteria of a particular implementation.

In another example, the alternate coordinates may be determined based on assumptions made by the capture device 100a. Generally, the capture device 100a may remain in the vehicle 200a and the vehicle 200a may stay in the same position when the vehicle 200a is not in use (e.g., a parked car will remain in the parking spot). The capture device 100a may make the assumption that the location coordinates when booting up (or starting the vehicle 200a) will be the same as the location coordinates prior to shutting down the capture device 100a. Generally, if the capture device 100a is installed in the vehicle 200a then under normal circumstances the capture device 100a may not move out of the vehicle 200a between power cycles (e.g., the power cycles may occur when the ignition is engaged/disengaged).

The capture device 100a may store the location coordinates prior to powering off (e.g., as part of a shutdown routine, stored periodically, etc.). The stored location coordinates may be used temporarily until the communication link with the GPS/GNSS satellites 302 is established and the location coordinates may be calculated. In some embodiments, dead reckoning may be implemented to determine the alternate coordinates based on the stored location coordinates and the movement of the vehicle 200a. The capture device 100a may provide an override option for using the stored location coordinates in circumstances where the vehicle position and/or location of the capture device 100a has changed (e.g., the vehicle 200a has been towed, etc.).

In the illustrative example 300, the license plate 306 is shown at a reference point of approximately 3.5 from the capture device 100a. The vehicle 200b is shown between the reference points 3.5 and 6 from the location of the capture device 100a. For example, the reference points may refer to distances in meters, feet, kilometers, miles, etc. The distances between the capture device 100a and objects detected in the video captured by the capture device 100a may be varied according to the design criteria of a particular implementation and/or the video quality captured by the capture device 100a.

Since the location coordinates determined by the capture device 100a is different than the location of objects detected in the captured video, using the location coordinates may not provide an accurate representation of the location of various objects in the capture video data. For example, if the location coordinates of the capture device 100a are used for the object 306 (or the object 200b), as the location value 186b shown in association with FIG. 2, then the illustrative scenario 300 may not be accurately recreated using the metadata 158 (e.g., all objects would be at the same location). The discrepancy between the location coordinates of the capture device 100a and the object under view (e.g., the license plate 306 and/or the vehicle 200b) may be subtle. However, depending on how the data is used, the discrepancy may be consequential.

The capture device 100a may be configured to perform video analysis to detect the objects (e.g., the license plate 306 and/or the vehicle 200b). The video analysis performed may also determine a distance of the objects from the capture device 100a. Using the distance determined by the video analysis, the capture device 100a may determine absolute coordinates of the objects. For example, the absolute coordinates may be determined with respect to the location coordinates determined by the capture device 100a. For example, the distance determined by the video analysis may be added to the location coordinates to determine the absolute coordinates. In some embodiments, the absolute coordinates may be stored as the location value 186b. In some embodiments, the distance of the object determined by the capture device 100a may be stored as the location value 186b and the absolute coordinates may be determined later. In the example shown, for the object 306, the location coordinates for the capture device 100a may be the 0 reference point, the distance from the capture device 100a may be approximately 3.5 and the absolute coordinates of the object 306 may be 3.5 (e.g., 0+3.5).

Figure 6:
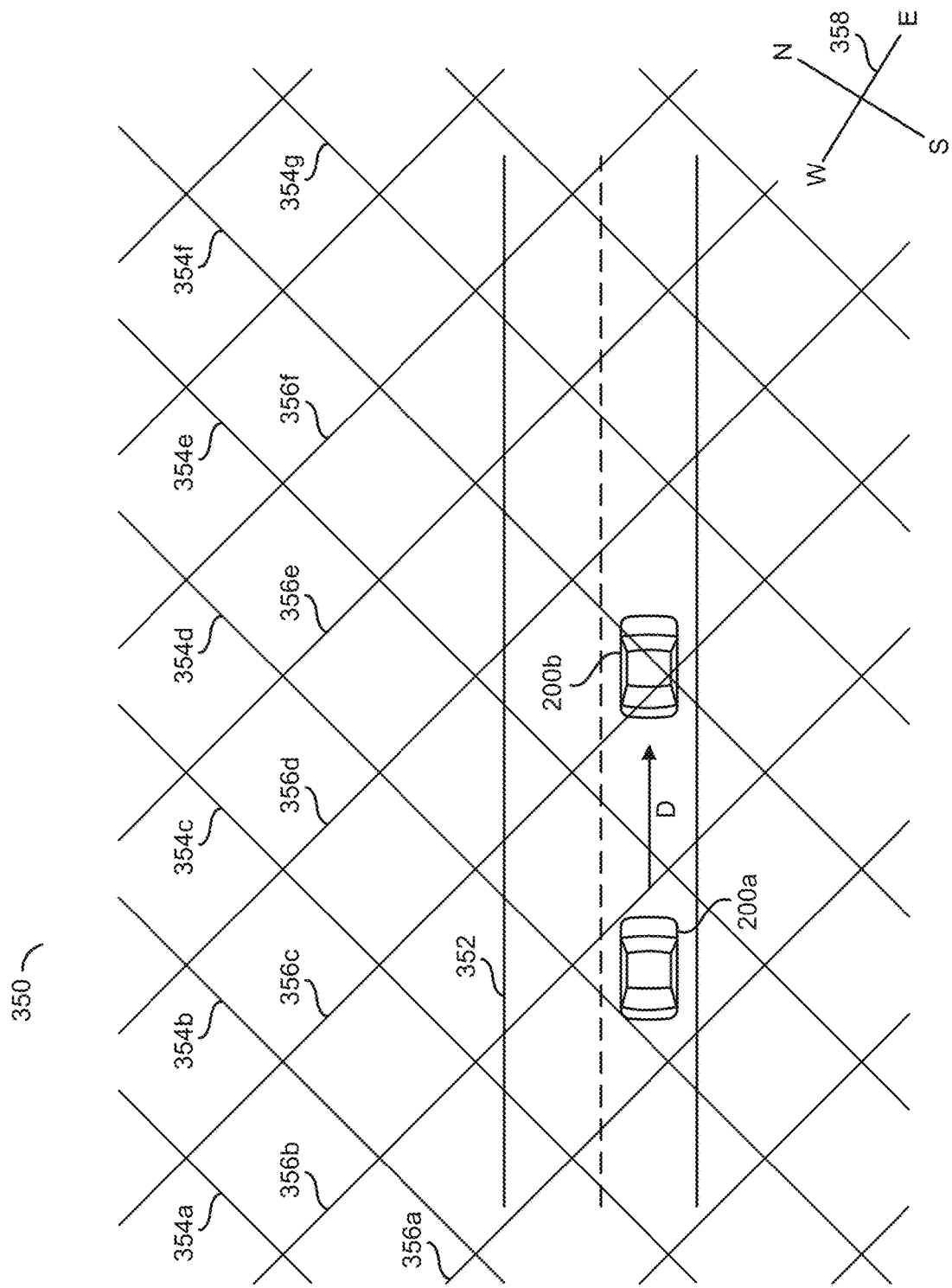
FIG. 6 is a diagram illustrating an overhead view of vehicles on a location grid.

Referring to FIG. 6, a diagram illustrating an overhead view 350 of vehicles on a location grid is shown. A road 352 is shown. The vehicles 200a-200b are shown on the road 352. Lines 354a-354n and lines 356a-356n are shown. The lines 354a-354n and/or the lines 356a-356n may represent a resolution of accuracy for the location coordinates determined in response to the location data from the GPS/GNSS satellites 302. A reference compass 358 is shown.

In the overhead view 350, the vehicle 200b is shown in front of the vehicle 200a (e.g., similar to the arrangement of the illustrative scenario 300 shown in association with FIG. 5). A distance (e.g., D) is shown between the vehicle 200a and the vehicle 200b. The distance D may be determined by the capture device 100a using the video analysis of the video frames captured. The distance D, calculated using the video analysis may provide a greater level of accuracy than the resolution provided by the GPS/GNSS satellites 302.

The vehicle 200a is shown between the lines 356a-356b and the lines 354d-354e. The vehicle 200b is generally shown near the lines 354e-354f and the lines 356c-354d. For example, even if the vehicle 200b determined location coordinates based on the GPS/GNSS satellites 302, the level of accuracy may not be sufficient to recreate the vehicle locations based on the metadata 158. For example GPS/GNSS may provide an accuracy of approximately 16 feet (e.g., 5 meters). Other factors (e.g., multipath errors, clock drift, urban environments, etc.) may reduce the accuracy of GPS/GNSs location coordinates. The lines 354a-354n and/or the lines 356a-356n may represent an amount of potential error of the GPS/GNSS location coordinates.

Using the video analysis to determine the distance D may provide greater precision of the relative distance D between the vehicle 200a (e.g., the capture device 100a) and the vehicle 200b (e.g., the detected object). Using the relative distance D, the metadata 158 may be used to re-create the overhead view 350 even when the video data is no longer available (e.g., using the metadata 158 alone). For example, even if the location coordinates determined by the capture device 100a (e.g., the reference position) have some inaccuracy, vehicle locations may still be re-created based on the metadata 158 in reference to the capture device 100a.

Furthermore, other objects detected in the video data (e.g., stationary landmarks such as buildings, street signs, billboards, etc.) may be used to infer the current location of the capture device 100a even when the GPS/GNSS locations coordinates are inaccurate. In some embodiments, the alternate coordinates (e.g., from the user communication device 112a) may be used to enhance and/or confirm the location coordinates determined by the capture device 100a.

The capture device 100a may further comprise a magnetometer. The magnetometer may be configured to determine the direction of travel of the capture device 100a. For example, using the video analysis to determine the distance D to the vehicle 200b may not provide a direction (e.g., the vehicle 200b could be anywhere on a circle of radius D from the capture device 100a). In the example shown (e.g., according to the reference compass 358), the distance D is shown in the NE direction. The magnetometer may determine that the capture device 100a is facing NE and that the vehicle 200b is approximately the distance D from the capture device 100a in the NE direction. The absolute coordinates may be determined based on the distance and direction from the location coordinates.

In some embodiments, the direction may be determined in response to the video analysis. In an example, the objects detected by the capture device 100a in the video data may comprise various landmarks. If the relationship between the landmarks (e.g., buildings, street signs, billboards, street lights, etc.) are known, the video analysis may determine the orientation of the known objects in the video data. The direction of travel and/or the direction that the capture device 100a is facing may be inferred based on the orientation and/or the relationship between the various known objects. In one example, the known objects may be determined based on numerous capture devices 100a-100n providing the absolute location of the same objects over time (e.g., hundreds of vehicles driving past the same buildings may provide sufficient information to identify the location of stationary reference objects).

Figure 7:
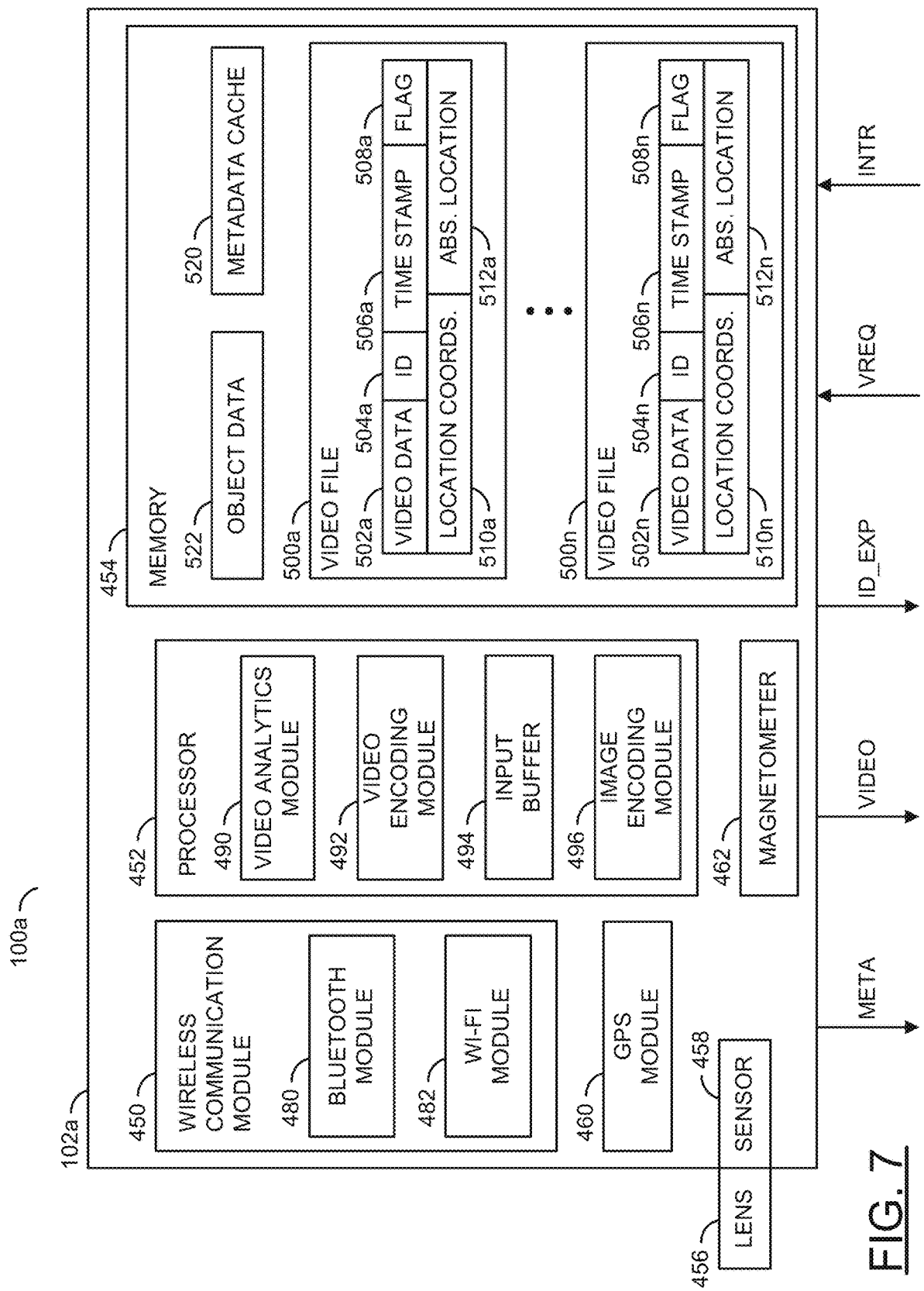
FIG. 7 is a block diagram illustrating an example implementation of circuit for performing the functionality of a vehicle-mounted camera.

Referring to FIG. 7, a block diagram illustrating an example implementation of the circuit 102a configured to perform the functionality of a vehicle-mounted camera 100a. The capture device 100a may be a representative example of one of the capture devices 100a-100n. The capture device 100a may comprise the circuit 102a. In some embodiments, the circuit 102a may be a main printed circuit board for the capture device 100a. In some embodiments, the circuit 102a may comprise various circuit boards, daughter boards and/or modules. For example, the circuit 102a may comprise multiple printed circuit boards connected using cables. In another example, the circuit 102a may comprise input/output slots configured to connect to drop in components (e.g., off-the-shelf components). Generally, the circuit 102a may be designed to fit a space and/or heat dissipation specification for the capture device 100a.

The circuit 102a may comprise a block (or circuit) 450, a block (or circuit) 452, a block (or circuit) 454, a block (or circuit) 456, a block (or circuit) 458, a block (or circuit) 460 and/or a block (or circuit) 462. The block 450 may implement a wireless communication module. The block 452 may implement a processor. The block 454 may implement a memory. The block 456 may implement a lens module. The block 458 may implement a camera sensor module. The block 460 may implement a location device (e.g., a GPS/GNSS module). The block 462 may implement a magnetometer. The circuit 102a may comprise other components (not shown). For example, the circuit 102a may comprise a firmware, input/output ports, memory expansion slots, a battery, a power adapter (for connection to an external power supply), etc. The components of the circuit 102a may be varied according to the design criteria of a particular implementation.

The circuit 102a is shown presenting a signal (e.g., META), a signal (e.g., VIDEO) and/or a signal (e.g., ID_EXP). The circuit 102a is shown receiving a signal (e.g., VREQ) and/or a signal (e.g., INTR). The circuit 102a may present the signal META, the signal VIDEO and/or the signal ID_EXP to a corresponding one of the user communication devices 112a (e.g., a paired wireless communication device). The circuit 102a may receive the signal VREQ and/or the signal INTR from the user communication device 112a.

The wireless communication module 450 may be configured to implement one or more wireless communication protocols. The wireless communication module 450 may be configured to transmit data and/or receive data. For example, the wireless communication module 450 may enable the circuit 102a to communicate with one or more of the user communication devices 112a-112n and/or the network 60. In the example shown, the wireless communication module 450 may comprise a block (or circuit) 480 and/or a block (or circuit) 482. The block 480 may implement a Bluetooth module. The block 482 may implement a Wi-Fi module. The wireless communication module 450 may comprise other components (not shown). For example, the wireless communication module 450 may comprise a module configured to implement 3G/4G/LTE/5G communication. The implementation of the wireless communication module 450 may be varied according to the design criteria of a particular implementation.

The Bluetooth module 480 may be configured to implement Bluetooth communication. For example, the Bluetooth module 480 may be configured to pair the circuit 102a with the user communication device 112a. The Bluetooth module 480 may enable a transfer of the video data and/or the metadata from the circuit 102a to the user communication device 112a. The Bluetooth module 480 may enable a short-range and/or low-power communication.

The Wi-Fi module 482 may be configured to implement Wi-Fi communication. In some embodiments, the Wi-Fi module 482 may be configured to connect to a local and/or wide area network. In some embodiments, the Wi-Fi module 482 may be configured to create a local network and other devices (e.g., the user communication device 112a) may connect to the Wi-Fi module 482. The Wi-Fi module 482 may enable wireless communication of the video data and/or the metadata. In some embodiments, the Wi-Fi module 482 may be configured implement a mesh network with other Wi-Fi modules. For example, the Wi-Fi module 482 implemented in the capture device 100a may form a mesh network with other nearby Wi-Fi module(s) 482 in the capture devices 100b-100n. Implementing a mesh network may enable the circuits 102a-102n to communicate using an ad-hoc Wi-Fi network as vehicles move around. For example, one or more of the data provider users may have a desired connectivity to the network 60 (e.g., sufficient upload bandwidth, sufficient data quota with the service provider, an unlimited data plan, etc.). Other data provider users that do not have the desired connectivity to the network 60 may use the mesh network to utilize the connectivity to the network 60 of data provider users that do have the desired connectivity to the network 60. The mesh network may help more of the data provider users to have reliable access to the network 60.

The processor 452 may be configured to read, write and/or process data, perform calculations and/or execute computer readable instructions. The processor 452 may implement one or more processing cores to enable parallel processing. The processor 452 may be implemented using various architectures (e.g., x86/x64, ARM, etc.). In some embodiments, the processor 452 may be a Tensor processing unit configured for deep machine learning. The processor 452 may be configured to perform various types of operations (e.g., a general purpose processor). In some embodiments, the processor 452 may implement various hardware modules configured to implement specific tasks. In the example shown, the processor 452 may comprise a block (or circuit) 490, a block (or circuit) 492, a block (or circuit) 494 and/or a block (or circuit) 496. The block 490 may comprise a video analytics module. The block 492 may comprise an encoding module. The block 494 may comprise an input buffer. The block 496 may comprise an image encoding module. The processor 452 may comprise other types of modules (not shown). For example, the processor 452 may further comprise an encryption module. The implementation of the processor 452 may be varied according to the design criteria of a particular implementation.

The video analytics module 490 may be configured to perform real-time video analytics on the captured video data. The video analytics module 490 may be configured to extract the metadata in response to the video analytics. The video analytics module 490 may be configured to scan visual data present in each video frame captured by the capture device 100*a*. In some embodiments, the video analytics module 490 may implement optical character recognition. In some embodiments, the video analytics module 490 may be configured to detect and/or classify objects detected in the video data. For example, the video analytics module 490 may compare features of the captured video frames to known features (e.g., templates) to identify an object captured in the video frame as a particular type of object (e.g., identify a vehicle as a particular make, model and year of a vehicle). The type of video analytics performed by the video analytics module 490 may be varied according to the design criteria of a particular implementation.

In some embodiments, the analytics performed by the video analytics module 490 may comprise determining characteristics of roadway features and/or objects. The metadata generated by the video analytic module 490 may be used as training data sets for machine learning. In one example, the capture devices 100*a*-100*n* may be implemented as dashboard cameras (e.g., dashcams) and the images captured may comprise various roadway data. The video analytics module 490 may analyze many images of various roadways and/or obstacles (e.g., curves, lane markings, curbs, street signs, traffic lights, license plate styles, road markings, pedestrians, vehicle types, vehicle makes, vehicle models, road hazards (e.g., snow, ice, flooding, chemical spills, etc.), construction barriers, etc.). The large amounts of metadata produced by the video analytics module 490 may provide many sample images and/or metadata of roadway data and/or object data. The data generated by the video analytics module 490 may be used to generate feature templates to improve detection when video analytics is performed (e.g., provide a greater data set to compare against). In an example, the metadata generated by the video analytics module 490 may be combined with data from other sensors (e.g., LIDAR, GPS and/or other sensors used to gather roadway data) for machine learning for autonomous driving.

In some embodiments, the analytics performed by the video analytics module 490 may comprise determining a distance of various detected objects from the lens 456. The video analytics module 490 may be configured to compare the sizes of objects detected in the video data with known object sizes. The video analytics module 490 may be configured to determine a region of a license plate, and compare the detected plate characters with the size of the license plate characters for the detected region (e.g., or vehicle type for vehicles such as motorcycles that have smaller plates). The video analytics module 490 may be configured to detect the corners of objects (e.g., such as the corners of a license plate) to determine a size of the detected object.

In some embodiments, the analytics performed by the video analytics module 490 may be configured to account for (e.g., normalize) objects that are at an angle to determine the size of the detected objects. For example, relationships between various portions of an object may be analyzed to determine an orientation of an object (e.g., rotated, at an angle, slanted, skewed, etc.). The video analytics module 490 may be configured to correct distortion caused by the lens 456. For example, de-warping may be performed to correct distortions caused by a wide (e.g., fisheye) lens.

The video analytics module 490 may comprise a number of libraries each configured to recognize various types of objects. Each of the libraries may be specialized and/or customized for detecting specific types of objects. In one example, one of the libraries may be configured to detect and/or identify vehicles in the captured video frames. In another example, one of the libraries may be configured to recognize street signs. In yet another example, one of the libraries may be configured to perform OCR for license plate reading. The libraries may be third party modules for recognizing objects that may be divided into discrete tasks. Different libraries may be provided by different vendors (e.g., each vendor may specialize in a particular area of object detection). The different libraries may run sequentially or in parallel and operate on different parts of the video frame stored in the input buffer 494.

The video encoding module 492 may be configured to encode and/or decode the captured video data. Encoding and/or decoding the captured video may compress the video data to enable more video data to be stored in the memory 454. The encoding and/or decoding performed by the video encoding module 492 may be lossless and/or lossy compression. The video encoding module 492 may perform the encoding on the captured video data in real-time. For example, the video encoding module 492 may implement encoding such as h.264, h.265, VP8, VP9, Daala, etc. The type of encoding implemented by the video encoding module 492 may be varied according to the design criteria of a particular implementation.

The input buffer 494 may be a memory configured to provide temporary storage for newly captured video data. The video data 494 may be in the input buffer while the video analytics module 490 performs the video analysis in real time and/or the video encoding module 492 performs the encoding operations to store the video data in the memory 454. The input buffer 494 may be configured to limit the amount of spatial data used from an input video frame as input to the buffer used for video analytics. By limiting the amount of spatial data input to the working buffer the inherently limited system resources of the real time system may allocated more efficiently.

The image encoding module 496 may be configured to encode and/or decode (e.g., convert) the captured video frames as still images. The image encoding module 496 may be configured to encode still images from the data stored in the input buffer 494. Encoding and/or decoding the captured video frames may compress the video frame to enable efficient storage of the still images (e.g., pictures) in the memory 454. The encoding and/or decoding performed by the image encoding module 496 may be lossless and/or lossy compression. The image encoding module 496 may perform the encoding on the captured video frames in real-time. For example, the image encoding module 496 may implement image formats such as JPEG, BMP, PNG, WebP, SVG, etc. The type of encoding implemented by the image encoding module 496 may be varied according to the design criteria of a particular implementation.

The memory 454 may be configured to store data. The memory 454 may comprise a solid state memory (e.g., NAND flash). In some embodiments, the memory 454 may comprise memory onboard the circuit 102a and/or external memory (e.g., a microSD card). The memory 454 may comprise blocks (or circuits) 500a-500n, a block (or circuit) 520 and/or a block (or circuit) 522. The blocks 500a-500n may each implement storage of a video file. The block 520 may implement a metadata cache. The block 522 may implement object data. The memory 454 may comprise other data (not shown). For example, the memory 454 may further comprise a firmware. The type of memory implemented by, the data arrangement of and/or the data stored by the memory 454 may be varied according to the design criteria of a particular implementation.

The video files 500a-500n may comprise the captured and/or recorded video. Each of the video files 500a-500n may comprise storage locations for a video clip (e.g., a discrete video recording and/or a video segment). In some embodiments, the video files 500a-500n may represent video clips having a same length (e.g., 2 minute video clips). In some embodiments, the video files 500a-500n may represent video clips (or segments) having different lengths (e.g., based on a storage size of each video file). Each video file storage location 500a-500n may comprise a corresponding one of blocks (or circuits) 502a-502n, blocks (or circuits) 504a-504n, blocks (or circuits) 506a-506n, blocks (or circuits) 508a-508n, blocks (or circuits) 510a-510n and/or blocks (or circuits) 512a-512n. The blocks 502a-502n may comprise the video data. The blocks 504a-504n may comprise the video ID. The blocks 506a-506n may comprise a time stamp. The blocks 508a-508n may comprise a flag. The blocks 510a-510n may comprise location coordinates and/or a direction. The blocks 512a-512n may comprise absolute locations. The video files 500a-500n may comprise other data (not shown). The type of data stored and/or the arrangement of data stored in the video files 500a-500n may be varied according to the design criteria of a particular implementation.

The video data 502a-502n may comprise the viewable captured video. The video data 502a-502n may be the data transmitted in response to a request from the subscriber user. The video data 502a-502n may be encoded by the encoding module 492 before the video files 500a-500n are created.

The video ID 504a-504n may comprise an identification for the video files 500a-500n. The video ID 504a-504n may be implemented as a data string comprising alphanumeric characters (e.g., a hash). The video ID 504a-504n may represent a portion of the metadata associated with the video files 500a-500n. The video ID 504a-504n may be used by the database 130 to locate and/or match the metadata clips 180a-180n to a particular one of the video files 500a-500n.

The time stamp 506a-506n may comprise an indication of when the video files 500a-500n have been recorded. The time stamp 506a-506n may comprise a data string. For example, the time stamp 506a-506n may indicate a year, a month, a date, a day of the week, an hour, a minute, seconds, fractions of a second, etc. The time stamp 506a-506n may represent a portion of the metadata associated with the video files 500a-500n. The time stamp 506a-506n may be used by the processor 452 to determine which of the video files 500a-500n is the oldest. The time stamp 506a-506n may be used by the processor 452 to determine an order that the video files 500a-500n were recorded, based on time. The time stamp 506a-506n may be used by the processor 452 to correlate the captured video data and/or extracted metadata with the location coordinates 510a-510n.

The flags 508a-508n may be used to indicate whether the video file 500a-500n may be overwritten. The flags 508a-508n may represent one or more preservation bits for the video files 500a-500n. In one example, when one of the flags 508a-508n is set (e.g., to indicate the file should be preserved) by the capture devices 100a-100n, the corresponding one of the video files 500a-500n may not be overwritten. In another example, when one of the flags 508a-508n is not set (e.g., to indicate the file should not be preserved), the corresponding one of the video files 500a-500n may be made available to be overwritten (e.g., by a new video file).

In some embodiments, the flags 508a-508n may be implemented using a single bit. In some embodiments, multiple bits may be used for each of the flags 508a-508n. In one example, when using multiple bits for the flags 508a-508n, a condition for determining how long to preserve the video files 500a-500n may be set (e.g., an amount of time, a particular date, an occurrence of an event, etc.). In another example, when multiple bits are used for the flags 508a-508n, different lengths of time to preserve the video files 500a-500n may be set based on a reason for preserving the video files 500a-500n (e.g., preserve video files for 3 days if a video is the result of a subscriber search, preserve video files indefinitely if the video is evidence, preserve video files one week if an event was captured, etc.). In yet another example, when multiple bits are used for the flags 508a-508n, the bits may represent an amount of time to preserve the video files 500a-500n based on a value of a subscriber user and/or subscription tier (e.g., a subscriber user paying a higher fee may result in a value of 5 being stored for the flags 508a-508n to indicate preservation for 5 days, a subscriber user paying a lower fee may result in a value of 2 being stored for the flags 508a-508n to indicate preservation for 2 days, etc.). Generally, a user that does not have a subscription to access the database 130 (e.g., a user that is not a subscription user) may not receive search results from the database 130 (e.g., the database 130 may not generate search results and/or may not allow a search query if a user is not one of the subscriber users). In some embodiments, the processor 452 may use the flags 508a-508n to decide when to overwrite the video files 500a-500n (e.g., compare the creation date of the video files 500a-500n plus the flag value to the current date). The implementation of the flags 508a-508n may be varied according to the design criteria of a particular implementation.

The location coordinates 510a-510n may comprise the location coordinates determined by the location device 460 determined at the time the corresponding video files 500a-500n were created. The location coordinates 510a-510n generally correspond with the location of the capture device 100a. The location coordinates 510a-510n may comprise a sequence of values (e.g., to track the location of the capture device 100a as the vehicle moves over the duration of the recording). The location coordinates 510a-510n may comprise longitude values, latitude values, altitude values and/or the alternate coordinates (e.g., location information from the user communication devices 112a-112n). The location coordinates 510a-510n may further comprise the direction of travel determined by the magnetometer 462. The direction of travel may correspond to the direction that the capture device 100a was facing when while the corresponding video files 500a-500n were recorded. The direction may be a sequence of values (e.g., to track the direction of the capture device 100a as the vehicle moves over the duration of the recording).

The absolute location 512a-512n may comprise the actual location of each of the objects identified by the video analytics module in the video data 502a-502n. The absolute coordinates 512a-512n may be determined based on the location coordinates 510a-510n (e.g., location and direction of the capture devices 100a-100n) and the distance of the detected objects from the capture devices 100a-100n. The distance of the objects may be determined by the video analytics module 490. The absolute locations 512a-512n may be a sequence of values associated with a particular detected object (e.g., each object detected may have a corresponding array of values). The sequence of values for the absolute locations 512a-512n may indicate where the detected object is over time (e.g., to track each of the detected objects over the duration of the recording). In some embodiments, the absolute locations 512a-512n may comprise a distance with reference to the capture device 100a (e.g., how far the object is from the capture device 100a). In some embodiments, the absolute locations 512a-512n may comprise real-world location values without reference to the capture device 100a (e.g., latitude, longitude, altitude, etc.).

The metadata cache 520 may be configured to store the metadata extracted by the video analytics module 490 and/or any other metadata corresponding to the captured video data 502a-502n. The metadata cache 520 may provide temporary storage. Generally, the metadata may not be stored long-term by the memory 454. For example, the metadata may be deleted after being successfully stored by the database 130 as the metadata 158. Temporarily storing the metadata may increase an amount of the memory 454 available for storing the video files 500a-500n. Some of the metadata may be stored long-term by the memory 454 (e.g., the video ID 504a-504n and/or the time stamp 506a-506n). The metadata cache 520 may provide storage for the metadata until the metadata is uploaded to the database 130. In some embodiments, when the database 130 communicates that the metadata for a particular one of the video files 500a-500n has been successfully stored, the metadata cache 520 may purge the corresponding metadata. Generally, the metadata files may be created in the metadata cache 520, filled with metadata, compressed, encrypted, transferred to the user communication devices 112a-112n, and then deleted from the metadata cache 520 (e.g., after a confirmation of successful upload to the database 130 has been received).

The object data 522 may comprise information about known objects. The information about known objects may be used to identify, detect, and/or compare objects in the video data 502a-502n. In one example, the object data 522 may comprise a database of vehicle makes, models, years, colors, sizes, dimensions, etc. In another example, the object data 522 may comprise regional information about license plates (e.g., shape, size, font, character size, design for each state/country, etc.). In yet another example, the object data 522 may comprise information about signs, billboards, buildings, cell towers, and/or other objects (trees, lane dividers, pylons, pedestrians, animals, etc.).

The video analytics module 490 may be configured to compare the objects detected in the video data 502a-502n with the known object data 522. The comparison may be used to determine the distance of the detected object from the capture device 100a. For example, if the detected object is a 2018 Ford F-150, the known dimensions of a 2018 Ford F-150 in the stored in the object data 522 may be compared with the dimensions of the detected 2018 Ford F-150. Based on a size comparison of the known and detected dimensions, the distance of the 2018 Ford F-150 from the capture device 100a may be determined. In another example, if a license plate is detected as a Michigan license plate, the size of the alphanumeric plate characters may be compared to the known size of characters for Michigan license plates to determine the distance of the license plate from the capture device 100a. The types of objects and/or information about objects stored in the object data 522 may be varied according to the design criteria of a particular implementation.

In some embodiments, the object detection may be performed in real-time and the distance calculations for the detected objects may be performed later. In an example, the object data 522 may not have the capacity to store known characteristics of all objects. For example, if the dimensions of the 2018 Ford F-150 are not currently stored in the known object data 522, the size comparison may be delayed. In an example, the capture device 100a may send a request to the user communication device 112a to retrieve dimensions for the 2018 Ford F-150. When the information becomes available to the capture device 100a, the size comparison may be performed.

The lens module 456 may be configured to focus light onto the camera sensor 458. The lens module 456 may comprise mechanisms for zooming, panning, tilting, focusing, adjusting a DC iris, etc. The camera sensor 458 may be configured to convert the light from the lens module 456 into images. The images generated by the camera sensor 458 may be the video frames of the captured video data. The video frames generated by the camera sensor 458 may be processed by the processor 452 to generate the captured video.

The location device 460 may be configured to calculate the location coordinates. In an example, the location device 460 may be a GPS/GNSS module. The location device 460 may be configured to communicate with the GPS/GNSS satellites 302, receive data from the GPS/GNSS satellites 302 and/or perform calculations on the data from the GPS/GNSS satellites 302 to determine the current location of the capture device 100a. The current location of the capture device 100a determined by the location device 460 may be stored as the location coordinates 510a-510n.

The magnetometer 462 may be configured to calculate a direction of travel and/or a direction the capture device 100a is facing. The direction of travel and/or direction the capture device 100a is facing may be a numerical representation of a direction and/or angle. The direction of the capture device 100a determined by the magnetometer 462 may be stored as the location coordinates 510a-510n. In some embodiments, if the magnetometer is not available the previous GPS coordinates may be used to infer the direction of travel.

The signal META may comprise the data that may be stored by the database 130 as the metadata 158 extracted from the captured video by the processor 452. The signal META may comprise the metadata stored by the metadata cache 520. The signal META may be generated by the metadata cache 520 and transmitted to the database 130 for storage and/or indexing. The wireless communication module 450 may implement a short-range, inexpensive and/or low power consumption communications protocol (e.g., Bluetooth) to communicate with the user communication device 112a. The user communication device 112a may forward the signal META from the circuit 102a to the network 60. The network 60 may transmit the signal META to the server 120 for storage in the database 130.

The signal VIDEO may comprise the video data 502a-502n recorded by the capture device 100a and/or the circuit 102a. The signal VIDEO may be generated by the wireless communication module 450 and transmitted to the server 120 and/or one of the subscriber devices 110a-110n. The wireless communication module 450 may implement a short-range, inexpensive and/or low power consumption communications protocol (e.g., Bluetooth) to communicate with the user communication device 112a. The user communication device 112a may forward the recorded video to the network 60.

Transmitting the video data 502a-502n to the subscriber users may be a low-priority data transfer. One of the flags 508a-508n corresponding to the video file 500a-500n being transferred may be set to ensure the video file 500a-500n is preserved at least until the data transfer is completed. Generally, the transfer of the signal VIDEO may not be initiated by the circuit 102a until the subscriber user requests the video. For example, if a user does not request a recorded video, the video file may eventually be overwritten by the capture device 100a. Since the recorded video is not transmitted until requested, unnecessary transfer and/or storage of data may be reduced.

The signal ID_EXP may comprise a notification (e.g., a flag) indicating that one of the video files 500a-500n stored by the memory 454 has expired (e.g., has been overwritten). The signal ID_EXP may comprise the video ID 504a-504n corresponding to the video files 500a-500n that has been overwritten. The capture device 100a may implement loop recording and, over time, may overwrite the video files 500a-500n (e.g., the oldest video data). The signal ID_EXP may be configured to notify the server 120 and/or the database 130 that one or more of the video files 500a-500n are no longer available. For example, the video ID 504a-504n may match the video file ID 182c stored as part of the metadata 158 to create a relationship between the video files 500a-500n stored in the memory 454 and the metadata 158 stored in the database 130. The signal ID_EXP may be generated by the wireless communication module 450 and transmitted to the database 130 for storage and/or indexing. For example, information transmitted by the signal ID_EXP may be stored as the expiration status flag metadata 182b in the clips 180a-180n (e.g., the metadata 158 may be updated in response to the notification to indicate that the portion of the video data corresponding to the signal ID_EXP may no longer be available). When the signal ID_EXP is received and when the corresponding video is requested, the server 120 may provide metadata only instead of video in response to the request from the subscriber user.

The metadata 158 stored in the database 130 may comprise the video ID 504a-504n of the corresponding video 500a-500n and/or store data used to derive the video ID 504a-504n and/or the capture device 100a-100n that stores the corresponding video file 500a-500n. For example, the metadata 158 may store the time stamp 506a-506n as the time 182a (e.g., when the first entry is inserted to the video files 500a-500n), a user ID as the camera ID 182n (e.g., to identify the user communication device 112a-112n corresponding to the capture device 100a-100n that captured the corresponding video files 500a-500n), a sequence number (e.g., a sequential number incrementing from 0 to 1029 and then looping back to 0). In one example, the metadata 158 may be a filed named "DATA-2017-03-07-14-30-00-00-01-0099.txt" (e.g., corresponding to the first timestamp and/or GPS entry deposited Mar. 7, 2017 at 2:30:00 PM by Driver ID #0001 and a sequence number of video file 0099). The contents of the file for the video clip metadata 180a-180n may comprise a sequence of lines of data. Each line of data may comprise at least a time stamp entry, a latitude and/or a longitude (e.g., 2017-03-07 14:30:00, 37.804440, −122.422874, 2017-03-07 14:30:20, 37.804440, −122.422874, etc.). Some lines of data may comprise a video file name and/or status of the video file (e.g., FILE DELETED: VIDEO-2017-03-06-14-30-00-0001-0022.MP4, FILE CREATED: VIDEO-2017-03-07-14-31-40-0001-0052.MP4, etc.). The video file names of the metadata 180a-180n may correspond with the names of the video files 500a-500n. The format of the metadata clips 180a-180n stored in the database 130 may be varied according to the design criteria of a particular implementation.

The signal VREQ may comprise a request to the capture device 100a configured to initiate an upload of one of the video files 500a-500n stored in the memory 454. For example, the transfer of the signal VIDEO may be initiated in response to the processor 452 receiving the signal VREQ. The signal VREQ may be generated by one of the subscriber devices 110a-110n. The signal VREQ may be generated in response to the subscriber user requesting a particular recorded video data clip. For example, the subscriber user may perform a search of the database 130 and receive a list of results based on the stored metadata. If the subscriber user does not request a video file (e.g., no signal VREQ received), the wireless communication module 450 may not upload video data. If the subscriber user does request one of the stored video files 500a-500n, the subscriber device (e.g., 110a) may generate the signal VREQ. The server 120 may determine which of the capture devices 100a-100n has the requested video file 500a-500n (e.g., based on the video list 172a and/or the device ID 182n of the clip metadata 180a-180n). The server 120 may transmit the signal VREQ to the network 60, to the corresponding user communication device (e.g., 112a) and then to the corresponding capture device 100a. In response to the signal VREQ, the server 120 may make the requested video file available to the subscriber user.

The signal INTR may comprise an interrupt request for the capture device 100a. The interrupt request communicated by the signal INTR may be configured to provide various instructions to the processor 452. In one example, the interrupt request may be used to initiate a live streaming mode for the capture device 100a. In a live streaming mode, the signal VIDEO may be streamed as a high priority data transfer (e.g., the capture device 100a may communicate with the server 120 without using the user communication device 112a). In another example, the interrupt request may be used to initiate video storage mode (e.g., record video as a loop recording). In still another example, the signal INTR may be transmitted to stop the capture device 100a from recording. In yet another example, the signal INTR may be transmitted to check if one or more of the video files 500a-500n are available and/or unavailable (e.g., check if information stored in the database 130 is consistent). Generally, the signal INTR is implemented to provide the processor 452 with a particular instruction to execute at a particular time (e.g., to cause the capture device 100a to change behavior on demand). The type of instructions transmitted as interrupt requests by the signal INTR may be varied according to the design criteria of a particular implementation.

The signal INTR may be transmitted to indicate that a particular one of the stored video files 500a-500n should be preserved. For example, one of the video files 500a-500n should be preserved when the video recording is an output result of a search request by one of the subscriber users. The database 130 may be configured to generate search results for a subscriber user based on the metadata 158 (e.g., in response to a search query submitted using the app 114a). The search results determined by the database 130 may correspond to one or more of the video files 500a-500n (e.g., based on the video IDs stored as part of the metadata 158). The database 130 may generate the signal INTR to preserve the video files 500a-500n that correspond to the search results. The database 130 may provide the signal INTR to one or more of the capture devices 100a-100n (e.g., by communicating with a corresponding one of the user communication devices 112a-112n) based on the search results (e.g., the metadata 158 may indicate which of the capture devices 100a-100n captured a particular video file and/or which of the user communication devices 112a-112n is associated with the capture devices 100a-100n that captured the particular video file).

The signal INTR may comprise one or more of the video IDs 504a-504n. The processor 452 may match the data in the signal INTR to the video IDs 504a-504n. The processor 452 may set the flags 508a-508n corresponding to the video files 500a-500n with the matching video IDs 504a-504n. The video files 500a-500n may be preserved in response to the signal INTR.

The processor 452 may be configured to receive captured images from the sensor 458, perform video analytics using the video analytics module 490 to extract the metadata, encode the captured video using the encoding module 492 and/or store the encoded video data as the video files 500a-500n in the memory 454. The video files 500a-500n may be created in the memory 454 to implement a loop recording. The loop recording implementation may create new video files 500a-500n in available (e.g., free) space in the memory 454. For example, if the memory 454 has free space available, the newest encoded video data may be stored in the free space of the memory 454 (e.g., previously stored data may not be overwritten). When the memory 454 is filled (e.g., stored to capacity), the memory 454 may overwrite previously stored data with the new data.

Generally, a loop recording default storage implementation may overwrite the oldest data (e.g., the video files 500a-500n having the oldest/lowest time stamp 506a-506n) first. For example, if the video file 500a is written into the memory 454 first and the video file 500i is written into the last of the available free space (e.g., video files 500a-500i take up all the available free space), then the next video file 500j may overwrite the video file 500a (e.g., and subsequently the video files 500b, 500c, etc. may be overwritten by new video data). The loop recording default storage implementation may enable the video files 500a-500n to be stored in the memory 454 as portions of a continuous recording (e.g., video may be continuously captured as the vehicle 200 is being driven and the video files 500a-500n may be the continuous video segmented into shorter clips).

The flags 508a-508n may be configured to override the loop recording default storage implementation. The flags 508a-508n may indicate that one or more of the video files 500a-500n should be preserved even if the video file would be the next (e.g., oldest) file to be overwritten in the loop recording default storage implementation. For example, if the video file 500a is written into the memory 454 first and the flag 508a is set, the video file 500b is written into the memory 454 second and the flag 508b is not set and the video file 500i is written into the last of the available free space (e.g., video files 500a-500i take up all the available free space), then the next video file 500j may overwrite the video file 500b instead of the video file 500a (e.g., and subsequently the video files 500c, 500d, etc. may be overwritten unless a respective one of the flags 508a-508n has been set). Generally, the processor 452 may store the next portion of the captured video (e.g., the newest created video file 500a-500n) in an empty storage location of the memory 454 when free space is available (e.g., one or more storage locations of the memory 454 are empty), and in one of the storage locations of the memory 454 that stores the oldest portion of the captured video (e.g., overwrite one of the video files 500a-500n having the oldest time stamp 506a-506n) that does not have the flag 508a-508n set if there are no empty storage locations in the memory 454.

The flags 508a-508n may be modified to enable the video files 500a-500n to be preserved in case that one of the subscriber users decides to request one of the video files 500a-500n. The flags 508a-508n may be implemented to strike a balance between preserving the video files 500a-500n that may be potentially requested, and ensuring that the memory 454 may have space available for recording new video files 500a-500n.

In some embodiments, the flags 508a-508n may be set to preserve a corresponding one of the video files 500a-500n when the database 130 selects the corresponding one of the video clips 180a-180n as the search result(s) in response to a search query from the subscriber users (e.g., sent using the app 114a on the subscriber devices 110a-110n). For example, from the search results of the query, the database 130 may identify the video ID(s) and/or the ID of the capture device(s) 100a-100n for the video clips 180a-180n based on the metadata 158. The database 130 may transmit the signal INTR to the capture device(s) 100a-100n corresponding to the ID of the capture device stored in the metadata 158. The signal INTR may identify the video IDs 504a-504n corresponding to the search result. When the signal INTR is received by the corresponding one of the circuits 102a-102n, the processor 452 may match the video IDs 504a-504n with the video files 500a-500n stored in the memory 454 and set (e.g., modify) the corresponding one of the flags 508a-508n to preserve the video. The flags 508a-508n may be set to preserve the video files 500a-500n when the metadata 158 corresponds to the search result determined by the database 130 (e.g., a request for the video files 500a-500n may not be needed for preservation). By preserving the video files 500a-500n in response to a match to a search query by the subscriber user, the system 50 may preserve the video files 500a-500n in the event that the subscriber user later decides to request the video file (e.g., the corresponding video file 500a-500n may be available when the signal VREQ is received). In some embodiments, the preserved video files 500a-500n may not be requested and to prevent any unnecessary use of data (e.g., data usage limits imposed by internet and/or cellular communication providers) the signal VIDEO may not be uploaded until formally requested by the subscriber user. The video files 500a-500n may be requested by the subscriber users using the app 114a.

In some embodiments, the flags 508a-508n may be set to preserve a corresponding one of the video files 500a-500n when an event has been determined to have occurred within a range of the capture devices 100a-100n. When an event has been determined to occur (e.g., a pre-scheduled notification to the system 50, a notification from police, a notification from news reporters, notifications from insurance investigators, etc.), the location and/or a time may be presented to the database 130 (e.g., similar to a search query from the subscriber users). In an example, when the event is pre-scheduled, the processor 452 may store the recorded video files 500a-500n that correspond to the event with the flags 508a-508n set to preserve. In another example, when the event is determined after the event has occurred, the database 130 may search the metadata 158 to determine the clips 180a-180n that match the event (e.g., a location, a time, a person of interest, a vehicle of interest, etc.). When the clips 180a-180n that match the event are found, the database 130 may find the video ID and/or the ID of the capture devices 100a-100n that potentially captured the event. The signal INTR may be sent to the capture devices 100a-100n that potentially captured the event, and the flags 508a-508n may be modified (e.g., set) for the video files 500a-500n that match the video IDs 504a-504n of the signal INTR. The flags 508a-508n may be set to preserve the video files 500a-500n when the metadata 158 corresponds to the event, even if the video has not been requested. By preserving the video files 500a-500n in response to a match of the event, the system 50 may preserve the video files 500a-500n in case that the video files 500a-500n are requested later.

Generally, the signal INTR may be sent to the capture devices 100a-100n to preserve the video files 500a-500n that have been captured within a range of the event by modifying the flags 508a-508n. In some embodiments, the range of the event may correspond to location coordinates and/or a time. When an event occurs, a notification may be sent (e.g., the signal INTR) to all capture devices 100a-100n storing video files 500a-500n with GPS tags (e.g., the location 186b) within the bounds of the locality where the event occurred. In one example, the event may be a person of interest (e.g., a wanted criminal, a missing person, a celebrity, etc.). In another example, the event may be a crime (e.g., a stolen vehicle, a shooting, an explosion, etc.). In yet another example, the event may be a natural phenomenon (e.g., an eclipse, extreme weather such as a hurricane, flooding, lightning, etc.). In still another example, the event may be a something known in advance (e.g., a parade, a ceremony, a celebration, a sports competition, etc.) and/or something not known ahead of time (e.g., an accident, an incident, a calamity, a catastrophe, a mishap, a phenomenon, etc.).

In some embodiments, the event may be conditions used for machine learning for autonomous driving (e.g., deep learning). For example, to provide training data for machine learning, particular situations, environments and/or circumstances may need to be analyzed. The processor 452 may be configured to identify particular situations, environments and/or circumstances. For example, if more training data is requested for blizzard (or flooding, or hail) conditions, the event may be when there is a blizzard (or flood, or hail) outside. In another example, if more training data is requested for identifying a type of animal, the event may be when an animal is detected. In yet another example, if more training data is requested for particular types of roadways, the event may be when pre-determined road conditions are detected. The conditions for an event may be varied according to the design criteria of a particular implementation.

When the flags 508a-508n are modified to preserve the video files 500a-500n, the video files 500a-500n may be preserved for a pre-determined amount of time. For example, when the flags 500a-500n are implemented as a single bit, the single bit may represent the pre-determined amount of time (e.g., one week). In another example, when the flags 500a-500n are implemented as multiple bits, the multiple bits may represent an amount of time to preserve the video (e.g., the bits may be encoded to represent time). Limiting the amount of time that the video files 500a-500n may be preserved may ensure that memory space is available for recording new video data (e.g., if too many videos are preserved, new videos may not be recorded). Limiting the amount of time that the video files 500a-500n may be preserved may prevent against malicious attacks and/or spam bots (e.g., prevent attacks that request all videos to prevent new data from being recorded).

In some embodiments, the pre-determined amount of time for preserving the video files 500a-500n may be configured to comply with local legislation. For example, privacy laws may limit data retention. In some embodiments, the processor 452 may determine a location of the capture device 100 and adjust the length of time for preservation based on the legislation of the region. The pre-determined amount of time for preserving the video files 500a-500n may be configured to be updated. For example, as legislation is adjusted, introduced and/or repealed and/or new court decisions are provided, the pre-determined amount of time may be updated to comply with the latest legislation. The pre-determined amount of time may be varied according to the design criteria of a particular implementation. In some embodiments, the video files 500a-500n and/or the metadata 158 may be purged to comply with the law. In some embodiments, the video files 500a-500n may have a default amount of time set to purge the data from the memory 454. The default amount of time to purge the data may be selected arbitrarily and/or based on the design criteria of a particular implementation.

In some embodiments, the signal INTR to preserve one or more of the video files 500a-500n may be received by the user communication device 112a-112n of the driver when the driver is not operating the vehicle (e.g., the capture device 100a-100n may not be powered on and/or communicating). The interrupt signal INTR may be queued by the user communication device 112a-112n (e.g., stored in memory) and transmitted to the capture device 100a-100n when the two units (e.g., the capture device 100a-100n and/or the user communication device 112a-112n) are both powered up and in proximity of each other. For example, there may be a delay between the database 130 sending the interrupt signal INTR and the capture devices 100a-100n receiving the information to preserve the video files 500a-500n. Generally, the capture device 100a-100n may not be in operation without a paired user communication device 112a-112n companion and data may not be overwritten.

In some embodiments, the system 50 may be implemented to aid in one or more of asset recovery (e.g., locating an asset with a large number of GPS data points from the metadata 158), roadway investigation (e.g., video evidence for post mortem analysis of roadway events), motor vehicle theft (e.g., real time location of stolen vehicles), locating a person of interest and/or providing roadway video for deep learning and autonomous driving training. In an example, when locating a person of interest, a person may be located based on a large number of GPS data points (e.g., the metadata 158) corresponding to the vehicle of the person of interest (e.g., often individuals are within 1000 feet of the vehicle the individual drives). In an example of providing roadway video, self-driving car developers train machine learning techniques (e.g., for deep learning) by collecting video and/or sensor streams of various scenarios and then annotate the streams (e.g., manually and/or automatically outlining and labeling various objects in each frame). In another example of providing roadway video data, an event recorded in the video files 500a-500n may comprise a particular road and/or weather type (e.g., the event may be defined as a hail storm that occurs within city boundaries, approaching a traffic signal during night, etc.). In some embodiments, the video analytics module 490 may have the ability to distinguish objects and the database 130 may be searched for video streams with particular characteristics (e.g., the hail storm). The hail storm may only last a few minutes, but assuming a large number of drivers are collecting data during the hail storm event, there may be a significant number of video streams available for download that match the criteria of a hail storm.

Figure 8:
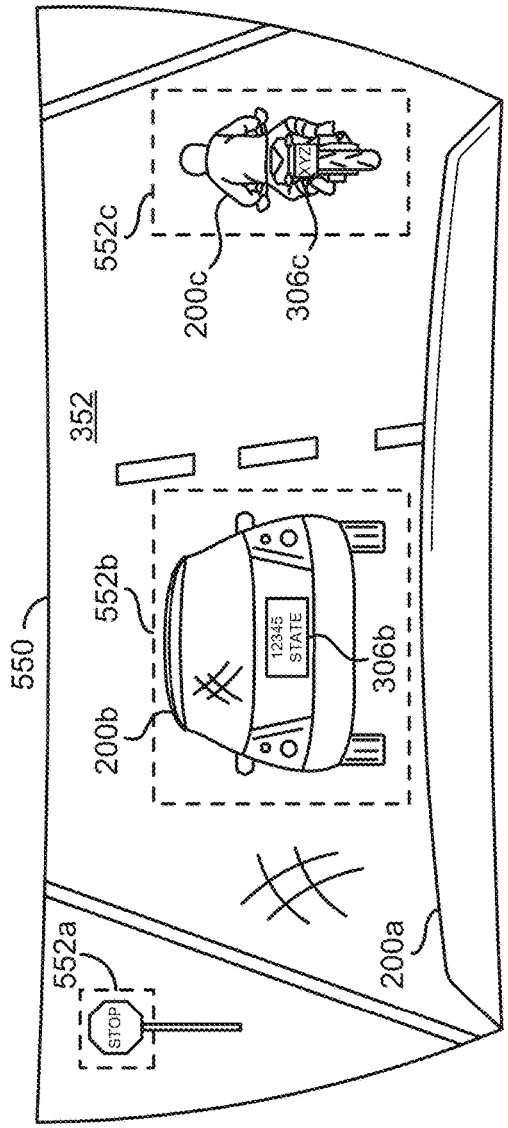
FIG. 8 is a diagram illustrating detecting objects in a captured video frame.

Referring to FIG. 8, a diagram illustrating detecting objects in a captured video frame 550 is shown. The captured video frame 550 may be an example of a video frame captured by the apparatus 100a while driving. In the example video frame 550, a portion of the ego vehicle 200a (e.g., the hood) is shown and the road 352 is shown. For example, the apparatus 100a may be implemented as a forward facing dashcam recording video data as the vehicle 200a is driving. In some embodiments, the vehicle 200a may drive with other cameras 100a-100n to capture every angle from the vehicle 200a (e.g., a 360 degree field of view around the vehicle 200a).

Objects 552a-552c are shown in the example video frame 550. For example, the objects 552a-552c may be examples of objects detected by the video analytics module 490 while analyzing the video data (e.g., the video frames in the input buffer 494). In the example shown, the detected object 552a may be a road sign (e.g., a stop sign), the detected object 552b may be the vehicle 200b (e.g., a car) and the detected object 552c may be the vehicle 200c (e.g., a motorcycle). While three detected objects 552a-552c are shown for illustrative purposes, the number of objects (e.g., 552a-552n) detected by the video analytics module 490 may be varied according to the design criteria of a particular implementation. For example, the video analytics module 490 may be configured to detect the road 352, markings on the road, pedestrians, buildings, what the markings on the road mean (e.g., turn lane, passing lane, school zone, etc.), animals, etc.

The video analytics module 490 may be further configured to detect various characteristics of the detected objects. In the example shown, one of the characteristics of the object 552b may be the license plate 306b. In another example, the license plate 306b may be one of the detected objects 552a-552n and the characters and/or the style of the characters of the license plate 306b may be characteristics of the detected object.

In one example, the video analytics module 490 may detect the road sign 552a. For example, the metadata (e.g., the characteristics of the object 552a) may be a classification of the object as a roadway sign. Additional classifications may provide additional details. For example, the object 552a may be detected as a stop sign (e.g., based on the shape, color and/or text on the sign). In another example, the video analytics module 490 may detect the object 552b as a particular make, model and/or year of vehicle. The metadata may comprise the color of the vehicle, any modifications to the vehicle (e.g., bumper stickers, dents, decals, truck balls, etc.). In yet another example, the video analytics module 490 may detect the object 552c as a motorcycle. The metadata may comprise the color and/or model of the motorcycle 200c. Other metadata for the object 552c may comprise information about the rider (e.g., the helmet, the bike jacket, etc.).

Metadata generated by the video analytics module 490 may comprise information about the license plates 306b-306c. For example, the size of the license plates 306b and 306c may be detected. In one example, the license plate 306b may be detected as a standard vehicle plate for a particular state. In another example, the license plate 306c may be detected as a motorcycle plate (e.g., generally smaller in size) for a particular state.

The system 50 may comprise the dash cameras 100a-100n capturing video and video metadata as the drivers navigate roadways. Onboard analytics (onboard the camera device) such as the video analytics module 490 may capture license plate characters and license plate state information in real time. The camera devices 100a-100n may have the on-board GPS functionality implemented by the GPS module 460 to enable the devices 100a-100n to correlate GPS (e.g., location coordinates) with captured license plate data (e.g., metadata). In one example, the time stamps 506a-506n may correlate the time that the location coordinates 510a-510n were determined with the time that the video data 502a-502n was captured. The time that the video data 502a-502n was captured may be the time associated with the metadata extracted from the video data 502a-502n.

The size of the license plates 306b-306c size and/or size of characters on the license plates 306b-306c or size of object identified as a vehicle or other metadata in the video or still frame 550 may be used to determine distance from the camera 100a and thus infer the GPS (e.g., absolute location) of the target object. The distance of the objects 552a-552c detected in the video frame 550 may be combined with the location coordinates 510a-510n to determine the absolute location 512a-512n.

In an example, the video analytics module 490 may be used to discern license plate characters. Generally, license plates have a (somewhat) regular size per region and vehicle type as do the majority of vehicles being processed. Depending on the region determined based on the GPS module 460 and/or other information (e.g., the country, state, province, the text on the plate, etc.) and other metadata (to determine vehicle type, vehicle make, vehicle model, etc.) the size of the license plate may be determined by the video analytics module 490. Furthermore, based on the region, the size (e.g., height and/or width) of the license plate characters may have a standardized size.

In some embodiments, the field of view of the lens 456 and/or the lens distortion for the capture devices 100a-100n are known. For example, the video analytics module 490 may take into account distortions and/or warping to the video frame 550 when determining the distance of the objects 552a-552c to the camera 100a. For example, the distance to the target license plates 306b-306c may be determined based on lens characteristics (e.g., known field of view, known lens distortion) and/or the location of the objects in each video frame. For example, the calculations performed by each of the capture devices 100a-100n may be slightly different due to variations in the lens characteristics.

The camera 100a may further comprise the magnetometer 362 to determine the direction of travel. With the camera GPS location coordinates 510a-510n, the distance to target determined by the video analytics module 490 and/or the direction of travel (or orientation of the cameras 100a-100n) determined by the magnetometer 462, the absolute GPS coordinates 512a-512n of each target may be more accurately determined.

Figure 9:
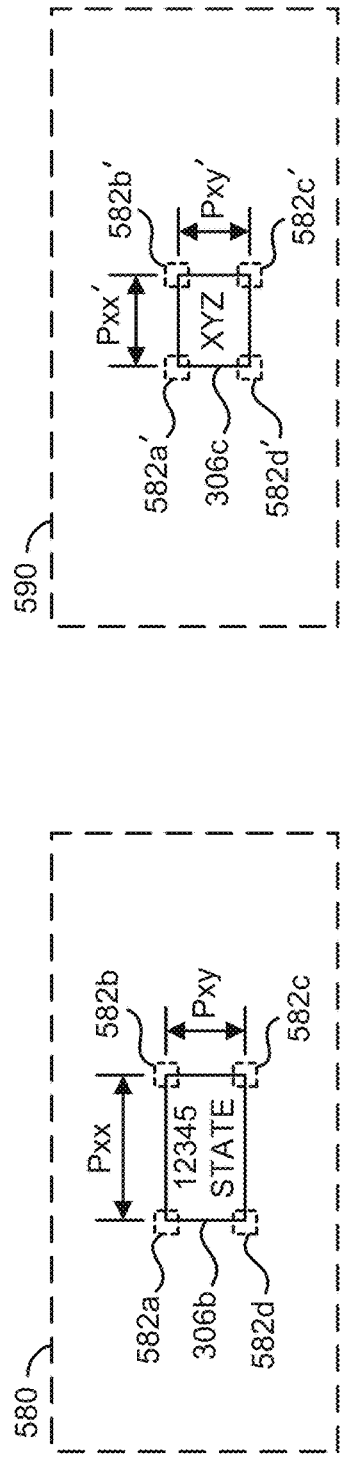
FIG. 9 is a diagram illustrating video analysis detecting a size of a license plate.

Referring to FIG. 9, a diagram illustrating video analysis detecting a size of a license plate is shown. A portion of a video frame 580 is shown. For example, the portion of the video frame 580 may be from the video frame 550 showing the license plate 306b of the vehicle 200b.

In the example shown, the license plate 306b may have a number of characters (e.g., alphanumeric license plate characters), and a region (e.g., a state, in the example shown). A horizontal distance (e.g., Pxx) and a vertical distance (e.g., Pxy) are shown. The horizontal distance Pxx may be a measurement of the width of the license plate in the captured video frame. The vertical distance Pxy may be a measurement of the height of the license plate in the captured video frame. For example, the video analytics module 490 may be configured to measure a number of pixels in the captured video frame occupied by the license plate 306b to determine various size characteristics of the license plate 306b. For example, the processor 452 may be configured to convert the number of pixels in the captured video frame occupied by the license plate into a physical distance (e.g., a measurement in inches).

Pixel locations 582a-582d are shown. The video analytics module 490 may be configured to identify the location of pixels that correspond to the 4 corners of the license plate 306b in the video frame. For example, the pixel location 582a may correspond to a top left corner of the license plate 306b, the pixel location 582b may correspond to a top right corner of the license plate 306b, the pixel location 582c may correspond to a bottom right corner of the license plate 306b, and the pixel location 582d may correspond to a bottom left corner of the license plate 306b. For example, the distance Pxx may be determined by measuring the distance between the pixel location 582a and the pixel location 582b. In another example, the distance Pxy may be determined by measuring the distance between the pixel location 582b and the pixel location 582c. While the distances Pxx and Pxy are shown, the video analytics module 490 may measure all sides of the license plate 306b and/or determine angles of each edge of the license plate 306b to determine the size of the license plate 306b in the captured video frame. The size of the license plate 306b in the captured video frame may be compared to a known size of a license plate (e.g., based on the region, standard sizes for plates in the region, etc.).

The output from a video analytics library may include the coordinates of the 4 corners of plate 582a-582n and/or the content of the character strings read from the license plate 306b (e.g., the license plate characters, the state name, the country, the state motto, the car dealership, etc.). The processor 452 may be configured to read and/or infer meaning from the character strings (e.g., a location). The four corners 582a-582n may indicate the relative size of the plate 306b in the frame and/or four corners of each character identified on the plate 306b. Once the relative size of the plate 306b is determined, the processor 452 may perform calculations based on the known (e.g., reference) size of the license plates for the region. By comparing the size of the known license plate to the relative size of the detected license plate, the distance D between the capture device 100a and the detected object 552b may be determined.

Implementing some color detection may add more value to the metadata being collected. The license plate processing performed by the video analytics module 490 may give the location of the license plate 306b in the video frame as well as an approximate relative size. With knowledge of the locality where the device 100a is operating and the relative size and position of the detected plate 306b, the likely region of the back of the vehicle 200b in the view may be calculated.

Figure 10:
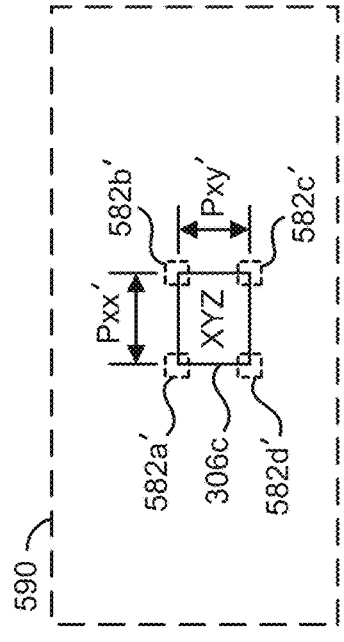
FIG. 10 is a diagram illustrating video analysis detecting a size of an alternate license plate.

Referring to FIG. 10, a diagram illustrating video analysis detecting a size of an alternate license plate is shown. A portion of a video frame 590 is shown. For example, the portion of the video frame 590 may be from the video frame 550 showing the license plate 306c of the motorcycle 200c.

In the example shown, the license plate 306c may have a number of characters (e.g., alphanumeric license plate characters), and a region (e.g., based on a color of the plate). A horizontal distance (e.g., Pxx') and a vertical distance (e.g., Pxy') are shown. The horizontal distance Pxx' may be a measurement of the width of the license plate in the captured video frame. The vertical distance Pxy' may be a measurement of the height of the license plate in the captured video frame. For example, the video analytics module 490 may be configured to measure a number of pixels in the captured video frame occupied by the license plate 306c to determine various size characteristics of the license plate 306c.

Pixel locations 582a'-582d' are shown. The video analytics module 490 may be configured to identify the location of pixels that correspond to the 4 corners of the license plate 306c in the video frame. For example, the pixel location 582a' may correspond to a top left corner of the license plate 306c, the pixel location 582b' may correspond to a top right corner of the license plate 306c, the pixel location 582c' may correspond to a bottom right corner of the license plate 306c, and the pixel location 582d' may correspond to a bottom left corner of the license plate 306c. For example, the distance Pxx' may be determined by measuring the distance between the pixel location 582a' and the pixel location 582b'. In another example, the distance Pxy' may be determined by measuring the distance between the pixel location 582b' and the pixel location 582c'.

In the example shown, the license plate 306c may be smaller than the license plate 306b shown in association with FIG. 9. Generally, motorcycle plates are smaller than standard vehicle plates. The known object data 522 may comprise information regarding standardized license plate dimensions. For example, each region may have laws corresponding to dimensions for each class of license plate. Generally, each class of license plate has particular character heights and/or widths. The size of the characters on the license plate 306c compared to the known size of the characters for license plates in the region may be used to determine the distance from the cameras 100a-100n. In some embodiments, the video analytics module 490 may cross-reference a size of the characters of the license plate 306c with the corner locations 582a'-582d' to determine an accurate distance.

Using other general knowledge regarding the make up of the view of the back of a vehicle 200c, the color may be approximated from one frame with a given probability. In many cases, the same license plate 306c may be detected a number of times in sequence and the probability of accurately determining the color may be increased. In some embodiments, one or more characters may be obscured in a particular video frame, but tracking the object over multiple video frames may eventually provide a view of the previously obscured character. In some embodiments, the video analysis module 490 may make an assumption about one or more characters of the plate based on previous knowledge (e.g., if a similar make, model, color, etc. of a vehicle has been previously detected with particular characters, then another later detection of the same make, model, color, etc. and most of the characters of the plate match, the assumption may be that the object is the same even if some of the characters are obscured).

In one example, the rear of the vehicles have the license plate centered. Most vehicles have identical (e.g., mirrored) red brake lights located on far left and right of the vehicle. If the camera is positioned at the center of the windshield of the vehicle 200a with a field of view straight forward in front, the position of the license plate of the vehicle 200c may be used to determine how much of the side of the vehicle would be present in the scene and if the side view was left or right.

The video analytics module 490 may be further configured to identify logos and/or dealership identifiers. For example, most logos are centered exactly above the license plate. In another example, many car dealerships provide a plastic cover for the license plates and have the dealership name on the plastic cover. The dealership name may be used to identify a region and/or identify a particular vehicle from other similar looking vehicles. In some embodiments, the video analytics module 490 may be configured to detect vehicle registration information on the detected license plate. For example, some regions use county and/or city identifiers (e.g., stickers, flag decals, etc.) to indicate where the vehicle is registered. The registration information may be analyzed to verify a state and/or region. For example, some city and/or county names may be unique to a particular state (e.g., a city of Pooler may be in Georgia).

Generally, the objects 552a-552c are detected by the video analytics module 490 and the four corners 482a-482d of the plate are identified. A pixel measurement may be used to determine a length and/or width of the license plate. In some embodiments, instead of the corners 582a-582d of the plate, the video analytics module 490 may detect the amount of space that the plate characters take up. Generally, the alphanumeric characters for the plate have to fit within a certain size. For example, the height of the characters may be the same size, even if a vanity plate has more letters which results in a narrower width of each character. For example, even if the corners 582a-582n of the plate are obscured in some way (e.g., by the plastic dealership cover), the video analytics module 490 may still determine the size based on the height of the plate characters.

Figure 11:
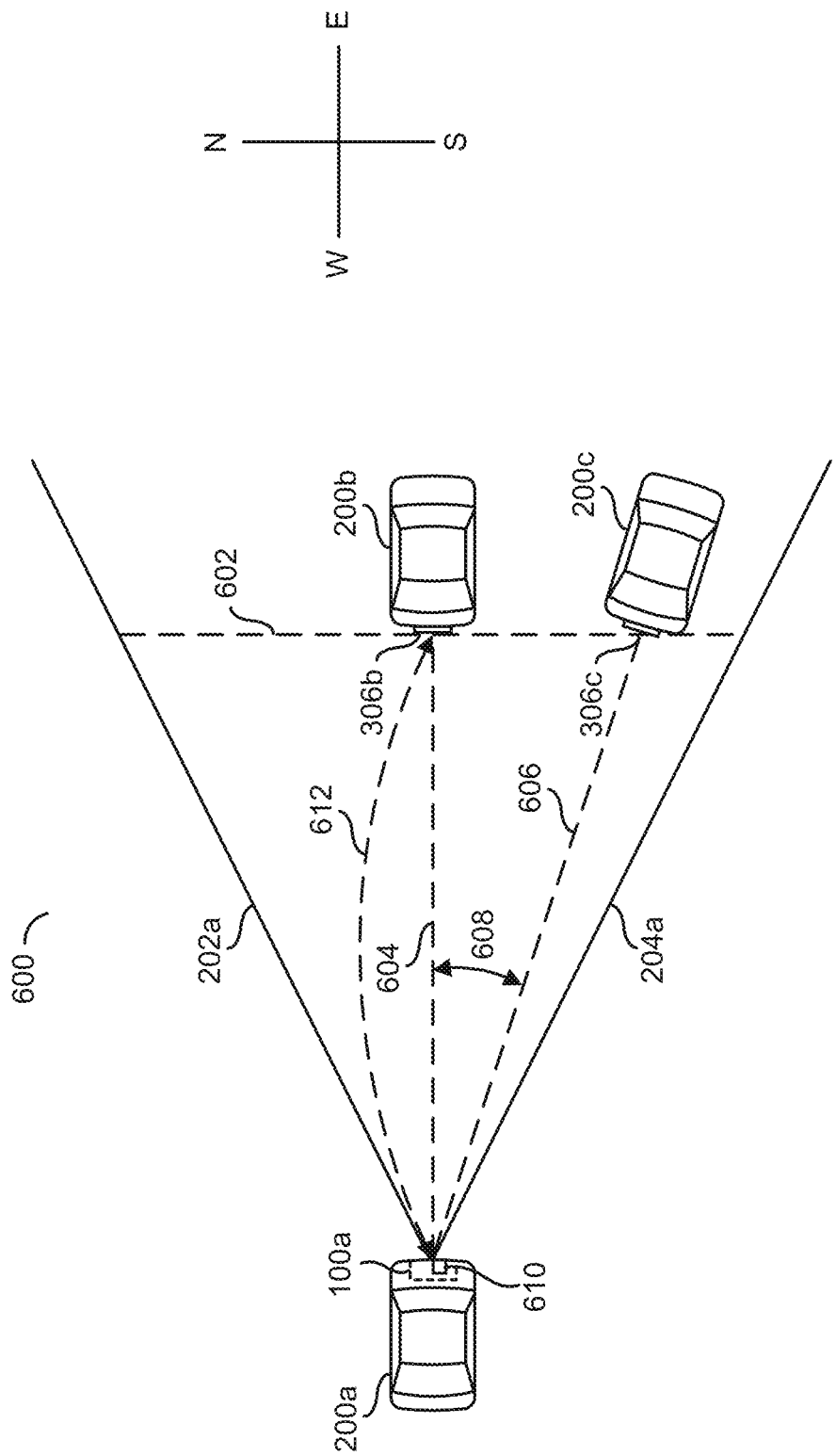
FIG. 11 is a diagram illustrating determining a distance for a vehicle at an angle.

Referring to FIG. 11, a diagram illustrating determining a distance for a vehicle at an angle is shown. An example scenario 600 is shown. In the example scenario 600, the camera 100a is shown in the ego vehicle 200a. The field of view 202a-204a of the capture device 100a is shown. The vehicle 200b and the vehicle 200c are shown within the field of view 202a-204a.

A line 602 is shown. The line 602 may be even with the license places 306b-306c of the vehicles 200b-200c. A line 604 and a line 606 are shown. The line 604 may represent a distance of the license plate 306b from the capture device 100a. The line 606 may represent a distance of the license plate 306c from the capture device 100a. An angle 608 is shown between the line 604 and the line 606.

Since the vehicle 200c is at an angle to the capture device 100a, the license plate 306c may be skewed in the captured video frames. When the license plate is skewed, the distances between the corners of the plate may not be straight lines. The video analytics module 490 may be configured to account for skewed license plates. The angle of the detected objects may be stored in the metadata. For example, if the license plate 306c is skewed in the captured video frame, the video analytics module 490 may make an assumption that the object the license plate 306c (e.g., the vehicle 200c) is also at an angle. Determining the particular angles of objects may enable the metadata to re-create the scenario (e.g., the context 600) even after the video data is deleted.

If GPS coordinates of the camera device 100a are not immediately available from the GPS module 460 the alternate coordinates may be queried (e.g., from the user device 112a) to determine the location coordinates. In some embodiments, the location coordinates determined by the GPS module 460 may be cross referenced with the alternate coordinates for accuracy.

In an example, the alternate coordinates from the user device 112a may be sent to the camera 100a when the camera is powered up and a Bluetooth connection is established. Receiving the alternate coordinates may reduce the latency of the camera GPS coming online as the driver begins collecting data. In some embodiments, a last known GPS coordinate location may be stored in a non-volatile memory of the camera (e.g., flash memory) when the camera is shut down (e.g., generally dash cameras remain in the vehicle at all times and power down and power up in the same location since they are power cycled as the car ignition is engaged and disengaged). Similarly the user devices 112a-112n implement a magnetometer which may be used or cross referenced similar to the GPS data. Additionally, previously captured data (either GPS and/or magnetometer) may be used to verify the accuracy of current data or to interpolate current data.

The apparatus 100a may implement computer vision (CV). The video analytics module 490 may make assumptions about the region of the plates based on the current location (e.g., GPS). In some embodiments, license plate readings may be discarded if the plate is not from the locality where the plate was captured (e.g., a European plate captured in the US may be discarded). For example, the known object data 522 may not store all possible plates regions to save space (e.g., generally a vehicle sold in the US will remain in North America). Plate sizes may be taken into account. If the camera is in a certain locality, some assumptions about the plate may be made with reasonable confidence as a matter of practicality. An implementation could make some assumptions about the size of plates in the locality where the occurrence is captured.

An angled plate may be accounted for. In one example, the process implemented by the video analytics module 490 may return coordinates of four corners of the plate. After compensating for lens distortion the skewed plates can be used to calculate vehicles detected at an angle from the camera lens 456. Generally, plate holders may not disrupt the corner detection. For example, a process that detects the corners of the plate (e.g., coordinates in the video frame) may be implemented. Coordinates of individual characters may be returned which may avoid issues of plate holders.

Storing the determined vehicle size as the metadata 158 may be important. The target application may re-enact a roadway scene long after all video archived in the dash cameras 100a-100n has expired. Since the GPS of the capture devices 100a-100n is known and the vehicles and roadway features captured by the capture devices 100a-100n have accurate location tagged and in the database, an interface may be provided to allow subscriber users (e.g., using the subscriber devices 110a-110n) to be able to re-enact a roadway incident by placing all observed objects on a map precisely as they were observed by the cameras 100a-100n.

In the example scenario 600, the capture device 100a is shown comprising a block (or circuit) 610. The circuit 610 may implement a time of flight (ToF) sensor. In one example, the time of flight sensor 610 may be an embedded component of the capture devices 100a-100n. In another example, the time of flight sensor 610 may be installed as an aftermarket component (e.g., add-on) for the capture devices 100a-100n.

A line 612 is shown. The line 612 may represent a time of flight determination by the time of flight sensor 610. In the example scenario 600, the line 612 is shown as curved. However, generally, the time of flight sensor 610 may determine time of flight using a straight path.

The time of flight sensor 610 may be configured to determine the distance to the identified object (e.g., the license plate 306b). In one example, the video analytics module 490 may be configured to identify the license plate 306b (or other objects and/or characteristics about the detected objects) and then the time of flight sensor 610 may be used to determine the distance to the detected object. In some embodiments, the processor 452 may determine an angle to the detected object using the video analysis techniques. For example, based on the angle determined by the video analysis module 490, the processor 452 may direct the time of flight sensor 610 to the detected object to determine the distance. In some embodiments, the video analysis module 490 may determine the distance to the detected object and the time of flight module 610 may provide a secondary source of information (e.g., a second data point for comparison and/or confirmation) for determining the distance and/or auditing the distance result determined by the video analytics module 490.

In the example shown, the time of flight sensor 610 is shown within the capture device 100*a*. However, there might be issues with the time of flight sensor 610 if located inside the windscreen (e.g., if the capture device 100*a* is mounted as a dashcam within the vehicle 200*a*). For example, the time of flight sensor 610 may need to be mounted outside of the windscreen (e.g., mounted on the windscreen or on the grille of the vehicle 200*a*). If the time of flight sensor 610 is located in a different location than the capture device 100*a*, then the distance from the capture device 100*a* to the time of flight sensor 610 may be considered when determining the distance (e.g., the GPS coordinates used for the location coordinates 510*a*-510*n* may be different than the location of the time of flight sensor 610 for determining the distance). In some embodiments, the processor 452 may use information from a previously installed time of flight sensor 610. For example, some vehicles may employ the time of flight sensor 610 for ADAS on the vehicle (e.g., a forward collision warning systems, etc.) and the capture device 100*a* may leverage the readings from the time of flight sensor 610 (e.g., the capture device 100*a* may be an aftermarket product and the time of flight sensor 610 may already be present and provide an API for reading data).

Figure 12:
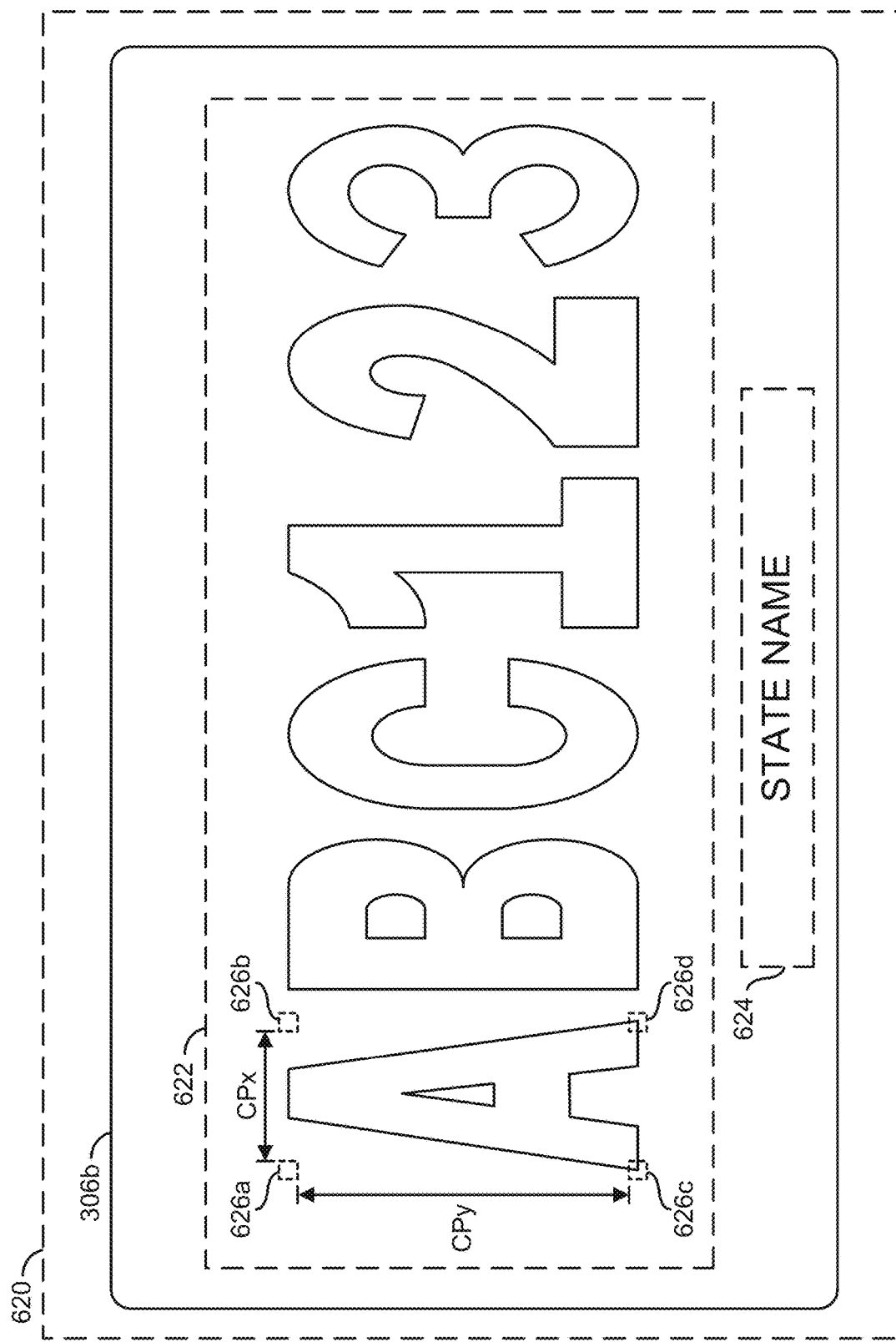
FIG. 12 is a diagram illustrating video analysis detecting a character size.

Referring to FIG. 12, a diagram illustrating video analysis detecting a character size is shown. An example video frame portion 620 is shown. The example video frame portion 620 may comprise the license plate 306*b*.

The video analytics module 490 may be configured to detect the license plate 306*b* in the example video frame portion 620. The video analytics module 490 may be further configured to detect characteristics 622-624 of the license plate 306*b*. In the example shown, the characteristics 622 may comprise the license plate characters. In the example shown, the characteristics 624 may comprise the state name (or other words such as a state/city motto). In some embodiments, the video analytics 490 may be configured to perform OCR to read the characters 622 and the words 624. The types of characteristics detected may be varied according to the design criteria of a particular implementation.

The video analytics module 490 may be configured to read each individual character of the characters 622. The video analytics module 490 may be configured to determine a size of each of the license plate alphanumeric characters. In the example shown, locations 626*a*-626*d* are shown at the corners of the first character of the characters 622. In the example shown, one character is shown with the locations 626*a*-626*d*. However, the video analytics module 490 may be configured to detect the corner locations 626*a*-626*d* of each of the characters of the detected characters 622.

The corner locations 626*a*-626*d* may be the pixel locations of the corners of the first character of the license plate 306*b*. The character pixel locations 626*a*-626*d* may be used to determine the size of the characters 622 in the license plate 306*b*. The video analytics module 490 may be configured to identify the location of pixels that correspond to the 4 corners of each individual character of the characters 622 of the license plate 306*b* in the video frame. For example, the pixel location 626*a* may correspond to a top left corner of the letter 'A', the pixel location 626*b* may correspond to a top right corner of the letter 'A', the pixel location 626*c* may correspond to a bottom left corner of the letter 'A' and the pixel location 626*d* may correspond to a bottom right corner of the letter 'A'.

A horizontal distance (e.g., CPx) and a vertical distance (e.g., CPy) are shown. The horizontal distance CPx may be a measurement of the width of the individual character (e.g., 'A') captured in the video frame. The vertical distance CPy may be a measurement of the height of the individual character (e.g., 'A') captured in the video frame. The horizontal distance CPx may correspond to a distance (e.g., number of pixels converted to a physical distance) between the pixel location 626*a* and the pixel location 626*b* (or the pixel location 626*c* and the pixel location 626*d*). The vertical distance CPy may correspond to a distance (e.g., number of pixels converted to a physical distance) between the pixel location 626*a* and the pixel location 626*c* (or the pixel location 626*b* and the pixel location 626*d*). For example, the video analytics module 490 may be configured to measure a number of pixels in the captured video frame occupied by the each individual character of the detected characters 622.

Generally, license plate characters may have a standardized size. For example, the distance CPy (or CPx) may be used to determine the size of the detected characters 622 in the captured video frame. In one example, the distance CPy may be compared to a known (e.g., standard) height for characters of a license plate for the region. In another example, the distance CPx may be compared to a known (e.g., standard) width for characters of a license plate for the region. The difference between the detected size CPy (or CPx) and the known size of the characters may be used by the processor 452 to determine the distance to the detected object (e.g., the license plate 306*b*). In some embodiments, the size of the characters 622 may provide a more reliable (or alternate) measurement for determining the distance (e.g., when the corners 582*a*-582*d* are obscured by a license plate holder).

In some embodiments, the known size of the license plate 306*b* may be determined by the matching the detected characters (using OCR). The processor 452 may be configured to read the detected character strings to infer meaning. For example, when the character recognition implemented by the video analytics module 490 returns a character string 622 that matches a string of a vehicle plate registered in a particular state (e.g., Georgia) and the colors of the plate and plate decoration (e.g., a background image of an orange colored peach in Georgia) are identified, the processor 452 may infer the meaning of the combined detections and the known plate size may be selected as a Georgia license plate. For example, the size of the Georgia plate may be used as the known (e.g., reference) size to compare to the detected size in the example video frame portion 620. Generally, the processor 452 may use multiple sources of data to infer the known (e.g., reference) license plate type (e.g., geolocation based on the GPS module 460, an OCR of the state name and/or city/state motto, the design (e.g., background, images, etc.), the colors (e.g., background color, color of characters, etc.), etc.). The information and/or characteristics of the detected object used by the processor 452 to infer meaning may be varied according to the design criteria of a particular implementation.

Figure 13:
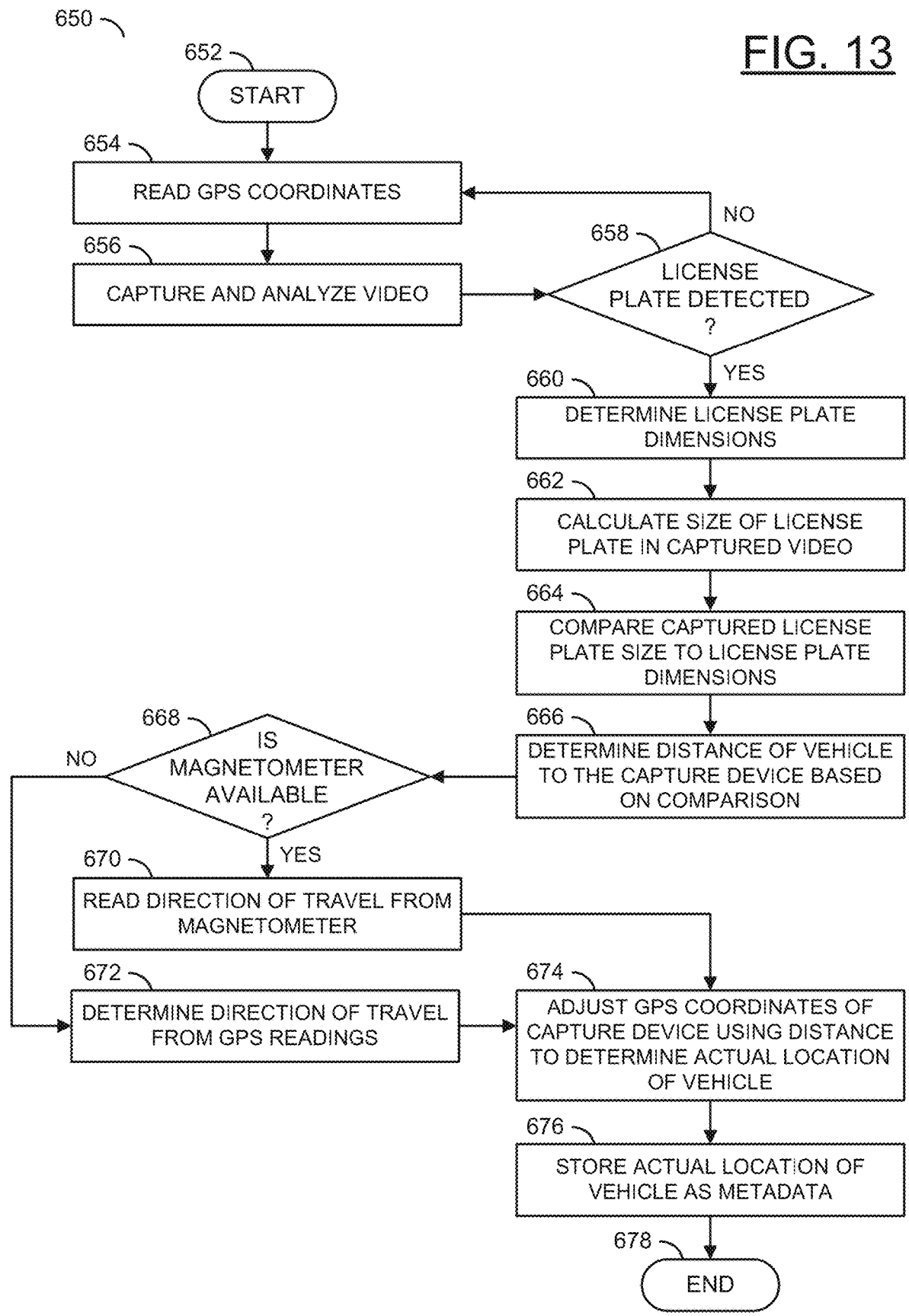
FIG. 13 is a flow diagram illustrating a method for determining a location of objects in a video frame.

Referring to FIG. 13, a method (or process) 650 is shown. The method 650 may determine a location of objects in a video frame. The method 650 generally comprises a step (or state) 652, a step (or state) 654, a step (or state) 656, a decision step (or state) 658, a step (or state) 660, a step (or state) 662, a step (or state) 664, a step (or state) 666, a decision step (or state) 668, a step (or state) 670, a step (or state) 672, a step (or state) 674, a step (or state) 676, and a step (or state) 678.

The step 652 may start the method 650. In the step 654, the processor 452 may read GPS coordinates received and/or calculated by the GPS module 460 (e.g., determine the location coordinates 510a-510n). In the step 656, the capture device 100a may capture and analyze video. For example, the sensor 458 may convert light into images and the processor 452 may generate video data. The video analytics module 490 may perform the video analysis on the video frames. Next, the method 650 may move to the decision step 658.

In the decision step 658, the video analytics module 490 may determine whether a license plate (e.g., the license plate 306b) has been detected. If the license plate has not been detected, the method 650 may return to the step 654. If the license plate has been detected, the method 650 may move to the step 660.

In the step 660, the video analytics module 490 may determine the license plate dimensions of the detected license plate 306b. In one example, the video analytics module 490 may detect the pixel locations 582a-582d corresponding to the four corners of the detected license plate 306b. Next, in the step 662, the video analytics module 490 may calculate a size of the detected license plate in the captured video. In one example, the pixel locations 582a-582d may be used to determine the horizontal distance Pxx and the vertical distance Pxy. For example, the calculated license plate size may be the size of the detected license plate 306b as the detected license plate 306b appears in the video frame 550. Next, the step 664, the processor 452 may compare the calculated license plate size of the detected license plate 306b (e.g., a conversion of a number of pixels to a physical measurement) to license plate dimensions. For example, the object data 522 may store information about license plate dimensions for the region (e.g., physical location) of the ego vehicle 200a. In one example, if the ego vehicle 200a is located in California, the object data 522 may provide the license plate dimensions of 12"×6" for a regular vehicle. In the step 666, the processor 452 may determine a distance of the vehicle 200b to the capture device 100a based on the comparison of the actual physical size dimensions of the license plate (e.g., known size) and the size of the detected license plate 306b in the video. Next, the method 650 may move to the decision step 668.

In the decision step 668, the processor 452 may determine whether a reading from the magnetometer 462 is available. If the magnetometer 462 is available, the method 650 may move to the step 670. In the step 670, the processor 452 may read the direction of travel of the ego vehicle 200a from the magnetometer and/or store the direction of travel as part of the location coordinates 510a-510n. Next, the method 650 may move to the step 674.

In the decision step 668, if the magnetometer 462 is not available, the method 650 may move to the step 672. In the step 672, the processor 452 may determine the direction of travel from readings from the GPS module 460 (e.g., comparing readings over time), by performing dead reckoning using vehicle sensors and/or using the video analytics (e.g., the location of a landmark, the location of the sun at a particular time of day, etc.). Next, the method 650 may move to the step 674. In the step 674, the processor 452 may adjust the GPS coordinates (e.g., the location coordinates 510a-510n) that represent the capture device 100a using the distance determined by the comparison of the physical dimensions of the license plate to the calculated dimensions of the license plate to determine the actual location of the detected vehicle 200b. In the step 676, the processor 452 may store the actual location of the detected vehicle 200b as metadata in the absolute location storage 512a-512n. Next, the method 650 may move to the step 678. The step 678 may end the method 650.

Figure 14:
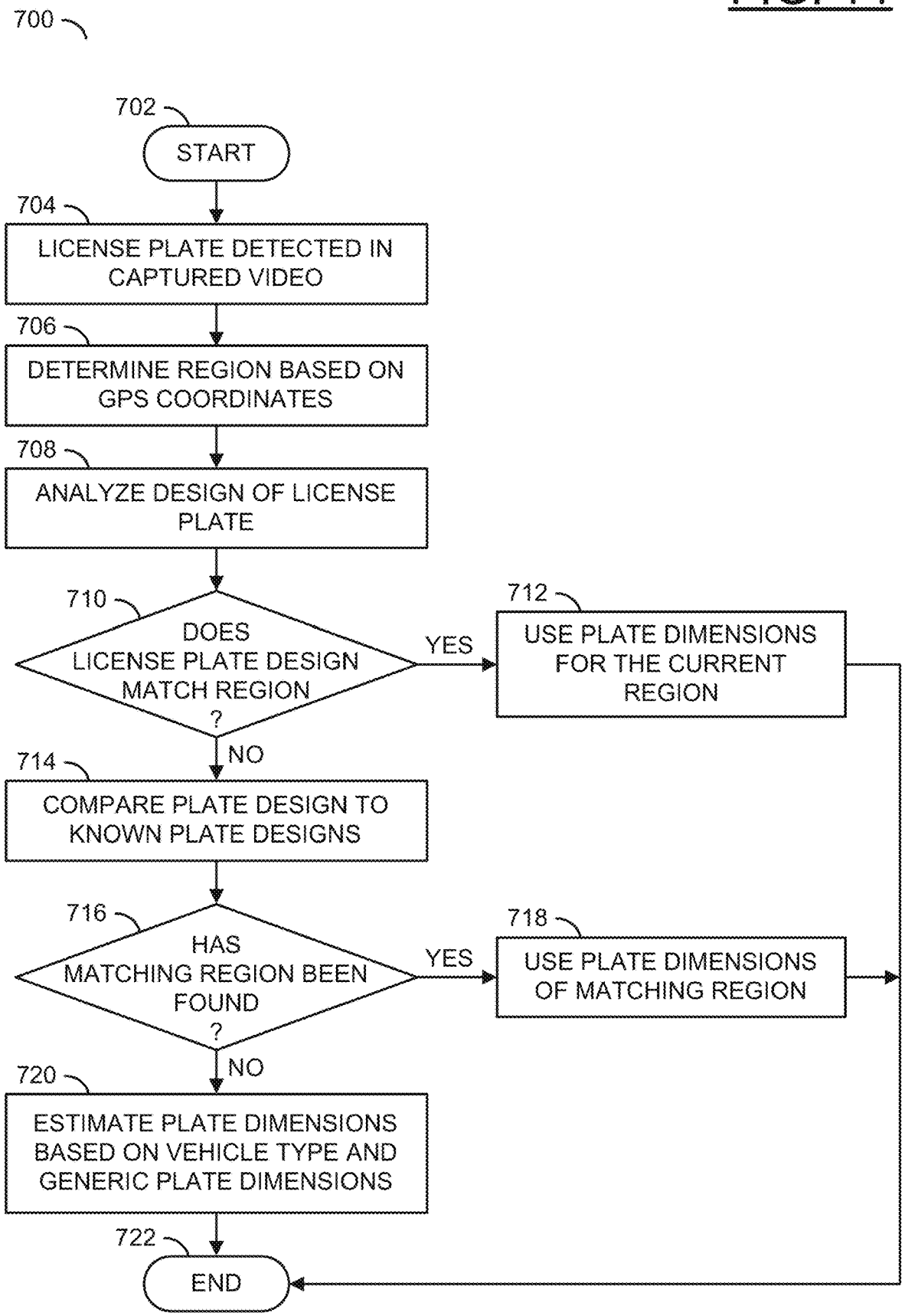
FIG. 14 is a flow diagram illustrating a method for determining object dimensions based on a region.

Referring to FIG. 14, a method (or process) 700 is shown. The method 700 may determine object dimensions based on a region. The method 700 generally comprises a step (or state) 702, a step (or state) 704, a step (or state) 706, a step (or state) 708, a decision step (or state) 710, a step (or state) 712, a step (or state) 714, a decision step (or state) 716, a step (or state) 718, a step (or state) 720, and a step (or state) 722.

The step 702 may start the method 700. In the step 704, the video analytics module 490 may detect the license plate (e.g., the license plate 306b) in the captured video (e.g., the video frame 550). Next, in the step 706, the processor 452 may determine the region of the capture device 100a based on GPS coordinates calculated and/or received by the GPS module 460. In the step 708, the video analytics module 492 may analyze the design of the detected license plate 306b. For example, the video analytics module 492 may analyze a background color, a font color, a font style and/or text of the detected license plate 306b using computer vision processing. Next, the method 700 may move to the decision step 710.

In the decision step 710, the processor 452 may determine whether the design of the detected license plate 306b matches the region. For example, if the region (e.g., based on the GPS coordinates) is in Michigan, then the design may be a white background with blue text having text reading 'Pure Michigan'. In another example, if the region is in Illinois, then the design may be a blue and white background, with red text, with an image of Lincoln and have the text 'Illinois' and 'Land of Lincoln'. If the detected design matches the region, then the method 700 may move to the step 712. In the step 712, the processor 452 may use the plate dimensions for the current region as a reference size to perform the comparison with the size in the video frame 550 of the detected license plate 306b. Next, the method 700 may move to the step 722.

In the decision step 710, if the detected design does not match the region, then the method 700 may move to the step 714. In the step 714, the video analytics module 490 may compare the design of the detected license plate 306b to known plate designs stored by the object data 522. In some embodiments, if the design of the detected license plate 306b is not stored locally by the object data 522, the wireless communication module 450 may communicate with the metadata server 120 and the metadata server 120 may have a larger storage capacity for additional license plate designs for comparison. Next, the method 700 may move to the decision step 716.

In the decision step 716, the processor 452 may determine whether a matching region has been found for the detected license plate 306b. If a matching region has been found, the method 700 may move to the step 718. In the step 718, the processor 452 may use the actual physical plate dimensions for the matching region as the reference (e.g., known) size to compare with the detected size of the detected license plate 306b in the video frame 550. Next, the method 700 may move to the step 722.

In the decision step 716, if the matching region has not been found, the method 700 may move to the step 720. In the step 720, the processor 452 may estimate the actual physical plate dimensions based on the vehicle type (e.g., regular vehicle, commercial vehicle, motorcycle, etc.) and/or generic license plate dimensions. For example, a regular vehicle license plate for most US states may be approximately 12"×6". Next, the method 700 may move to the step 722. The step 722 may end the method 700.

The actual (e.g., physical) license plate dimensions may be determined based on the detected region. The physical license plate dimensions may be used as a reference size (e.g., the known size of the license plates). The region may be different countries. For example, all plates in the US are generally the same size. Canadian license plates are generally the same size as US plates, so the region may cover most of North America. The video analytics module 490 may look at the color of the plate (or the name of the state on the plate) to help figure out the reference dimensions (e.g., the known size). Generally, license plates in Europe look different (e.g., different size, more letters, different font, different colors, etc.). Many vehicles have some type of license plate holder for the plate (e.g., usually a plastic border having a dealership name). In some embodiments, the outside dimensions of the license plate holders may be used for the basis of the calculated dimensions of the detected license plate and/or the physical dimensions of the license plate. In one example, the dimensions of the license plate characters themselves may be used (e.g., the size of the characters may be standard in a particular locality and/or plate type). The characters on the license plates may be used as a reference size and may be compared to the detected characters on the detected license plate for determining the distance from the capture devices 100a-100n. Processing characters may prevent issues caused by license plate holders.

Figure 15:
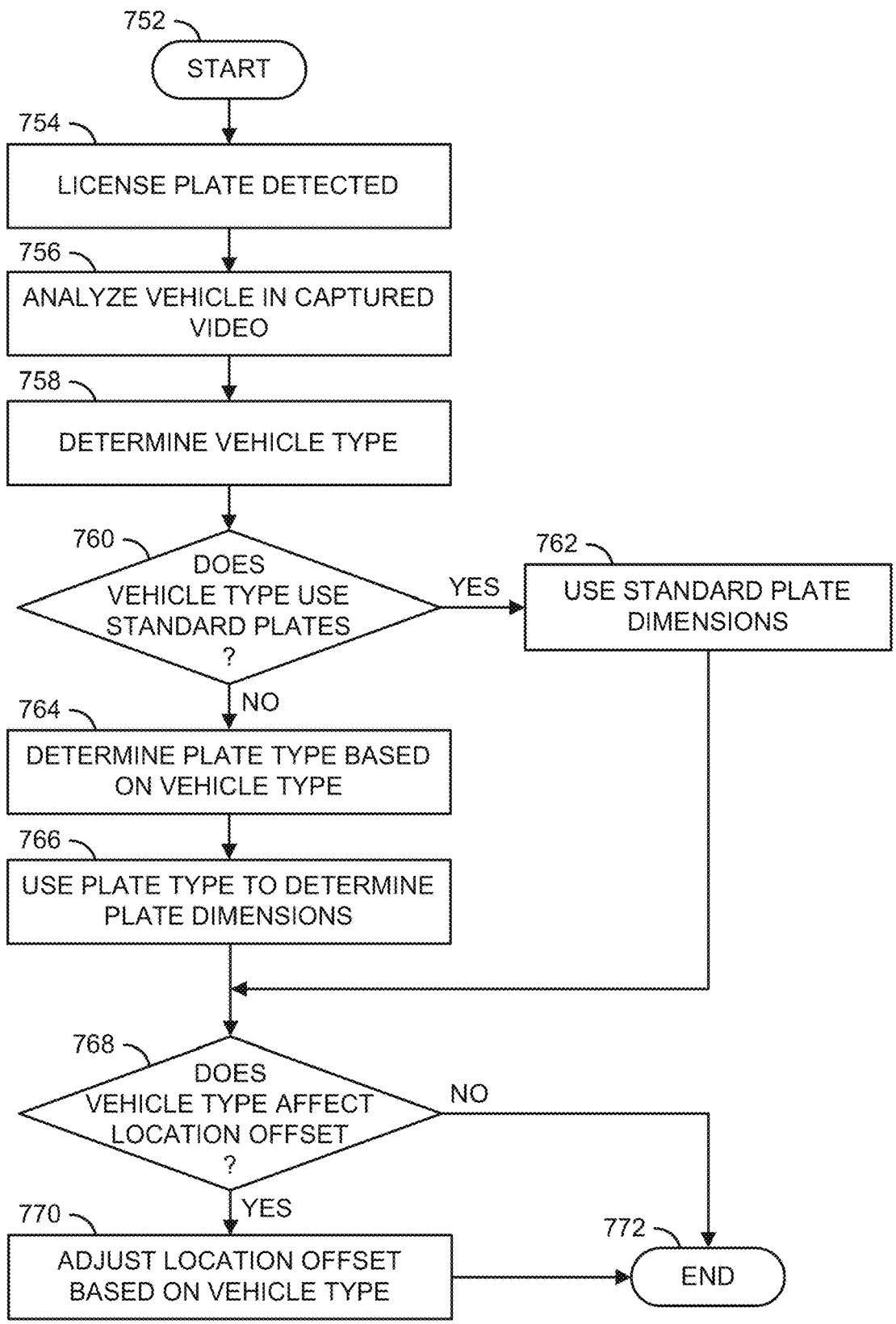
FIG. 15 is a flow diagram illustrating a method for determining a type of object.

Referring to FIG. 15, a method (or process) 750 is shown. The method 750 may determine a type of object. The method 750 generally comprises a step (or state) 752, a step (or state) 754, a step (or state) 756, a step (or state) 758, a decision step (or state) 760, a step (or state) 762, a step (or state) 764, a step (or state) 766, a decision step (or state) 768, a step (or state) 770, and a step (or state) 772.

The step 752 may start the method 750. In the step 754, the license plate 306b and/or the license plate 306c may be detected by the video analytics module 490. Next, in the step 756, the video analytics module 490 may analyze the vehicles 200b-200c corresponding to the detected license plates 306b-306c using computer vision operations. In the step 758, the video analytics module 490 may determine a vehicle type of the detected vehicles 200b-200c (e.g., a sedan and a motorcycle, respectively, in the example shown in association with FIG. 8). In one example, the vehicle type may be determined based on the object data 522. Next, the method 750 may move to the decision step 760.

In the decision step 760, the processor 490 may determine whether the detected vehicles 200b-200c use standard license plates. In one example, the sedan 200b may use a standard license plate. In another example, the motorcycle 200c may not use a standard license plate. If the detected vehicles 200b-200c use standard license plates, the method 750 may move to the step 762. In the step 762, the processor 452 may use standard license plate dimensions for the comparison of the size of the detected plate 200b and the physical license plate dimensions (e.g., 12"×6"). Next, the method 750 may move to the decision step 768.

In the decision step 760, if the detected vehicles 200b-200c do not use standard license plates, the method 750 may move to the step 764. In the step 764, the processor 452 may determine the type of plate based on the type of vehicle determined by the video analytics module 490. Next, in the step 766, the processor 452 may use the plate type determined in order to determine the reference physical plate dimensions for the detected vehicle 200c. In an example, the type of the vehicle 200c may be determined to be a motorcycle, and the physical plate dimensions for a motorcycle may be approximately 7"×4". Next, the method 750 may move to the decision step 768.

In the decision step 768, the processor 452 may determine whether the vehicle type affects a location and/or dimension offset for the location of the detected vehicles 200b-200c. In an example, the metadata 158 may comprise a location and general dimensions of the detected vehicles 200b-200c (e.g., so that the metadata 158 may be used to re-create an arrangement of vehicles on the road even after the video data 502a-502n is deleted). For example, the metadata 158 may store a location and/or size of the vehicle in order to accurately re-create the arrangement of vehicles (e.g., a sedan takes up less space than a transport truck). If the vehicle type does not affect the location offset (e.g., a default value for a location offset may be for a passenger vehicle), then the method 750 may move to the step 772. If the vehicle type does affect the location offset (e.g., a smaller vehicle such as a motorcycle and/or a larger vehicle such as a shipping truck), the method 750 may move to the step 770. Next, in the step 770, the processor 452 may adjust the location offset for the detected vehicles 200b-200c based on the vehicle type. Next, the method 750 may move to the step 772. The step 772 may end the method 750.

Determining the type of vehicle may help determine the size of the detected license plates (e.g., standard vehicle plates or motorcycle plates). Similarly, determining the type of the detected license plate may help determine the type of vehicle. In some embodiments, the size of the license plates may help determine the box model for the vehicle.

Generally, the metadata 158 may be used to model the vehicles and/or other objects as a box model (or other rough approximation of size) so the amount of space that a detected vehicle takes up is known using only the metadata 158. In one example, if the vehicle is a transport truck, then the object might take up more space than an average car. The processor 452 may take into account the size of the objects when tagging the absolute location 512a-512n. For example, the absolute location 512a-512n may comprise a location of the detected vehicles in the video frame, as well as offsets to represent the size of the vehicle (e.g., provide rough dimensions). For example, the box model may comprise four coordinates representing the four corners of the detected vehicle. The video analytics module 490 may tag the position of the license plate, regardless of the type of vehicle the license plate is attached to. In one example, for a standard sedan (e.g., approximately having a size of 190"×70") that the processor 452 determines is at the absolute location X,Y may have a box model of 190"×70" with respect to the absolute location X,Y. For example, the box model of the detected vehicles may be stored as part of the metadata 158 and used by the remote database 130 to generate a searchable database of vehicle locations (e.g., available even after video data is no longer available). The format of the box model around the absolute location in the metadata 158 may be varied according to the design criteria of a particular implementation.

Figure 16:
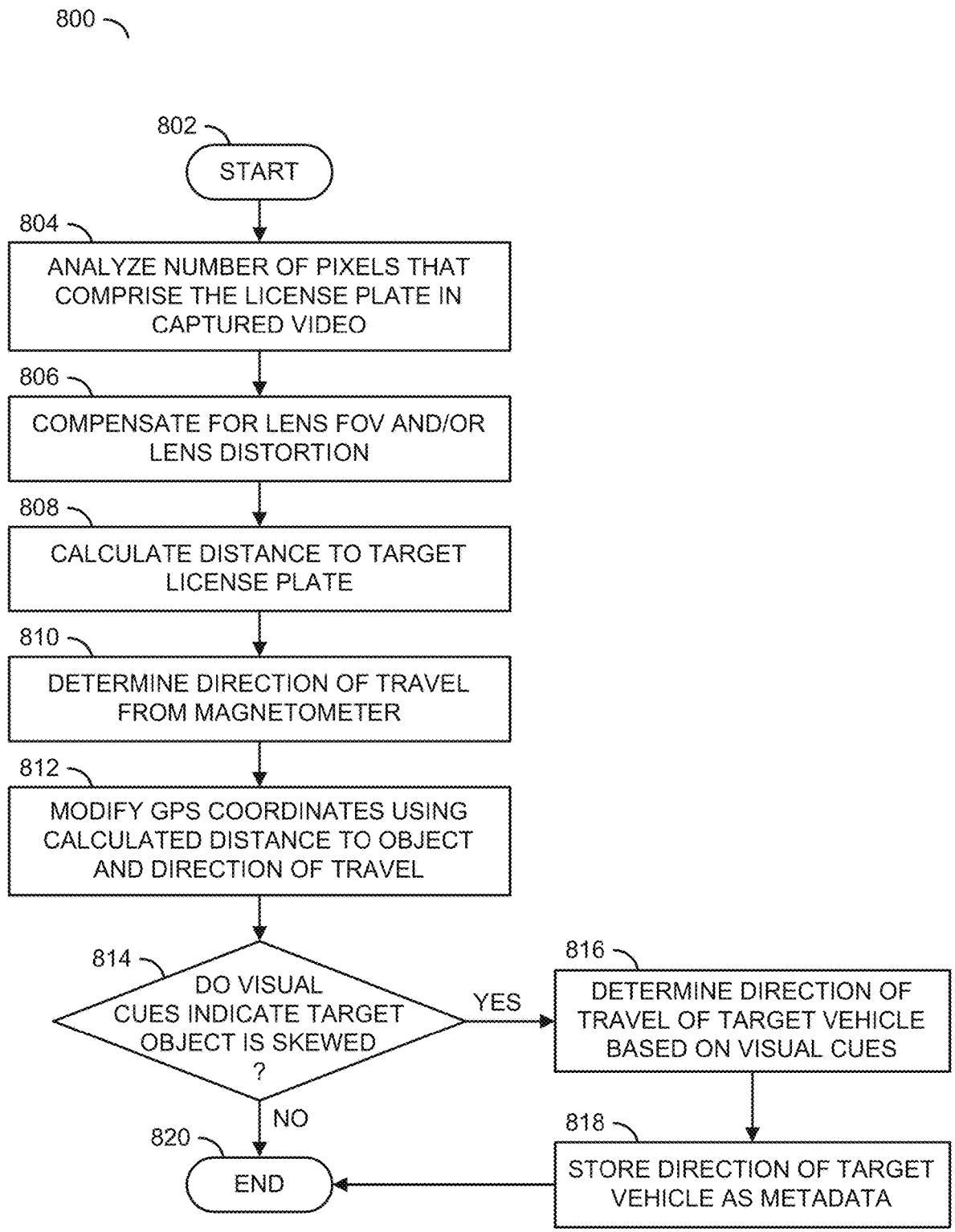
FIG. 16 is a flow diagram illustrating a method for altering location analysis in response to lens characteristics.

Referring to FIG. 16, a method (or process) 800 is shown. The method 800 may alter location analysis in response to lens characteristics. The method 800 generally comprises a step (or state) 802, a step (or state) 804, a step (or state) 806, a step (or state) 808, a step (or state) 810, a step (or state) 812, a decision step (or state) 814, a step (or state) 816, a step (or state) 818, and a step (or state) 820.

The step 802 may start the method 800. In the step 804, the video analytics module 490 may analyze a number of pixels that comprise the detected license plate (e.g., the license plate 306c shown in association with FIG. 11) in the captured video frame 550. Next, in the step 806, the processor 452 may perform video operations to compensate for the field of view of the lens 456 and/or distortion caused by the lens 456. In the step 808, the processor 452 may calculate a distance to the target license plate 306c. Next, in the step 810, the processor 452 may determine the direction of travel using information from the magnetometer 462. In the step 812, the processor 452 may modify the GPS coordinates received and/or calculated by the GPS module 460 using the calculated distance to the object (e.g., the license plate 306c) from the video data and the direction of travel from the magnetometer 462. Next, the method 800 may move to the decision step 814.

In the decision step 814, the video analytics module 490 may determine whether visual cues in the video data indicate that the target object (e.g., the license plate 306c) is skewed. If the visual cues do not indicate that the target object is skewed, the method 800 may move to the step 820. If the visual cues indicate that the target object is skewed, the method 800 may move to the step 816.

In the step 816, the video analytics module 490 may determine the direction of travel of the target vehicle 200c based on the visual cues. For example, if the target license plate 306c is skewed such that a left side of the license plate 306c is farther away from the capture device 100a than a right side of the license plate 306c than the target vehicle 200c may be traveling at an angle to the vehicle 200a (e.g., if the vehicle 200a is traveling east, then the vehicle 200c may be traveling southeast). Next, in the step 818, the processor 452 may store the direction of the target vehicle 200c as part of the metadata as the absolute location information 512a-512n. Next, the method 800 may move to the step 820. The step 820 may end the method 800.

The video analytics module 490 may detect visual cues from the shape of the detected vehicles 200b-200c and/or other roadway data. The visual cues from other portions of the captured video frames may be used to determine the shape and/or size of objects and/or license plates. In one example, the visual cue may be a skewed shape of the detected license plates 306b-306c (e.g., not rectangular, one side farther away than the other side, a rotation of the license plate, etc.). The video analytics module 490 may further add some steps for taking into account the FOV and lens distortion when figuring out the distance. For example, the characteristics of the lens 456 may be known in advance by the processor 452. The processor 452 may compensate for the lens characteristics when the size of the detected license plates 306b-306c is calculated. In one example, the processor 452 may be configured to perform de-warping operations on the captured video frames to compensate for the lens characteristics.

Figure 17:
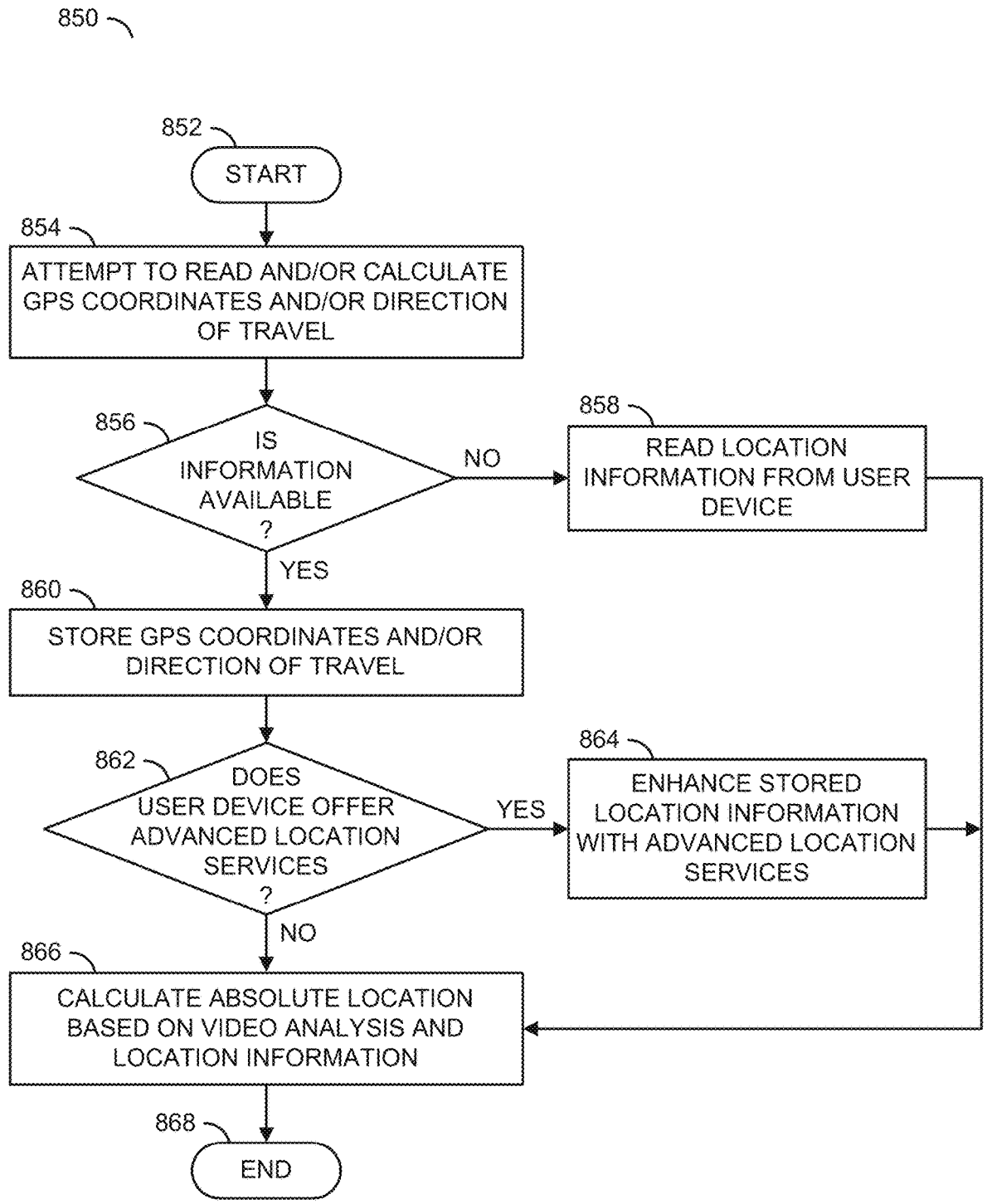
FIG. 17 is a flow diagram illustrating a method for enhancing location coordinates.

Referring to FIG. 17, a method (or process) 850 is shown. The method 850 may enhance location coordinates. The method 850 generally comprises a step (or state) 852, a step (or state) 854, a decision step (or state) 856, a step (or state) 858, a step (or state) 860, a decision step (or state) 862, a step (or state) 864, a step (or state) 866, and a step (or state) 868.

The step 852 may start the method 850. In the step 854, the GPS module 460 may attempt to read and/or calculate the GPS coordinates and/or the magnetometer 462 may attempt to read and/or calculate the direction of travel of the capture device 100a (e.g., the circuit 102a may determine the location coordinates). Next, the method 850 may move to the decision step 856.

In the decision step 856, the processor 452 may determine whether the information (e.g., GPS coordinates and/or the direction of travel) is available. For example, the GPS module 460 may be malfunctioning and/or unable to communicate with satellites. If the information is not available, the method 850 may move to the step 858. In the step 858, the circuit 102a may read location information generated by the paired user device 112a. For example, if the user device 112a is a smartphone, smartphones may provide a GPS connection, a magnetometer and/or other types of location data (e.g., cell tower triangulation). The circuit 102a may leverage the GPS connection and/or magnetometer of the smartphone 112a to receive location information (e.g., coordinates and/or direction of travel). Next, the method 850 may move to the decision step 866.

In the decision step 856, if the information is available, the method 850 may move to the step 860. In the step 860, the processor 452 may store the location information (e.g., the GPS coordinates from the GPS module 460 and/or the direction of travel from the magnetometer 462) in the memory 454 (e.g., as the location coordinates 510a-510n). Next, the method 850 may move to the decision step 862.

In the decision step 862, the processor 452 may determine whether the user device 112a offers advanced location services. In one example, when the capture device 100a pairs with the user device 112a, the processor 452 may query the capabilities of the user device 112a (e.g., networking capabilities, processing capabilities, location service capabilities, hardware information, etc.). If the advanced location services are available, the method 850 may move to the step 864. In the step 864, the processor 452 may enhance the stored location coordinates 510a-510n using the information received from the advanced location services of the user device 112a. Next, the method 850 may move to the step 866.

In the decision step 862, if the advanced location services are not offered (e.g., the capture device 100a has the same or better location services than the user device 112a), then the method 850 may move to the step 866. In the step 866, the processor 452 may calculate the absolute location 512a-512n based on the video analysis (e.g., performed by the video analytics module 490) and the location information (e.g., determining the distance to the detected license plates by comparing the detected size to the actual physical reference size of the license plates). Next, the method 850 may move to the step 868. The step 868 may end the method 850.

The enhanced location information received from the user devices 112a-112n may be the alternate coordinates that may be used to supplement the location coordinates determined by the capture device 100a. In one example, the camera systems 100a-100n may be in use over a long period of time (e.g., years) and in that time users may upgrade the user devices 112a-112n (e.g., get new smartphones). The newer smartphones may have advanced location services (e.g., cell tower triangulation, location based on Wi-Fi networks, social media app check-ins, other location services, etc.) and may be used to provide additional precision to the location coordinates determined by the capture device 100a. In some embodiments, the hardware of the circuits 102a-102n may be upgradeable (e.g., new hardware modules may be added and/or replace old hardware, firmware updates may update capabilities, etc.). If the location services provided by the circuits 102a-102n are on par with the location services of the user devices 112a-112n, then receiving location information from the user devices 112a-112n may be unnecessary. In some embodiments, even when the location determination capabilities of the capture devices 100a-100n is the same or better than the location determination capabilities of the user devices 112a-112n, the processor 452 may use the alternate coordinates from the user devices 112a-112n for auditing results calculated by the circuits 102a-102n and/or for re-calibration.

Similarly, the alternate coordinates (e.g., for enhanced precision and/or auditing results of the GPS module 460 and/or the magnetometer 462), may be provided by a location module (e.g., GPS unit) from the ego vehicle 200a. For example, many vehicles have an embedded GPS sensor (e.g., used by services such as OnStar and/or other navigation and/or roadside assistance systems). In one example, the embedded GPS sensor of the ego vehicle 200a may provide the alternate location coordinates via the CAN bus connection. In another example, the GPS sensor of the ego vehicle 200a may provide the alternate location coordinates via a wireless connection and/or another bus. The processor 452 may be configured to leverage location data received and/or determined by the embedded GPS sensor of the vehicle 200a. Furthermore, the processor 452 may be configured to leverage location data received and/or determined by an aftermarket navigation system. In an example, a manufacturer of the aftermarket product may expose an API to enable reading an onboard GPS signal. Similarly, a second smartphone (e.g., a different smartphone than the user device 112a) may be used to provide the alternate coordinates. For example, some people use a separate tablet computing device and/or phone for navigation in order to free up another smartphone used for communication, texting, Uber app, etc.

The functions performed by the diagrams of FIGS. 1-17 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a location device configured to retrieve location coordinates of said apparatus; and
   a processor configured to (a) receive video frames captured by a capture device, (b) perform video analysis on said video frames to (i) detect an object in said video frames and (ii) extract metadata that describes characteristics about said object detected in said video frames, (c) add said location coordinates of said capture device to said metadata over a number of timestamps when said processor detects said object, (d) determine a distance from said apparatus to said object in said video frames, (e) determine a skew of said object in said video frames and (f) calculate an absolute location of said object in response to said distance, said location coordinates and a direction of travel of said object, wherein (i) said skew of said object is determined based on a difference in said distance from said capture device between one side of said object and another side of said object, (ii) said difference in distance from said capture device between said one side of said object and said another side of said object is used to determine an angle of said direction of travel of said object with respect to said capture device, (iii) said distance is determined by comparing a size of said object detected in said video frames after compensating for said skew with a known size of said object, (iv) said absolute location for said object in said video frames is added to said metadata, and (v) said metadata comprises (a) said characteristics of said object, (b) said location coordinates of said capture device and (c) said absolute location of said object.

2. The apparatus according to claim 1, further comprising a magnetometer configured to determine said direction of travel, wherein said magnetometer provides an alternate calculation of said direction of travel for said absolute location.

3. The apparatus according to claim 1, wherein the processor is further configured to determine said skew in response to determining an orientation of said object based on relationships between various portions of said object.

4. The apparatus according to claim 1, further comprising a wireless communication device configured to connect to a smartphone.

5. The apparatus according to claim 4, wherein (i) said video frames are stored locally on said apparatus, (ii) said metadata for said video frames is transmitted from said apparatus separately from said video frames, (iii) said apparatus communicates said metadata to said smartphone and (iv) said smartphone communicates said metadata a remote database.

6. The apparatus according to claim 5, wherein said remote database is configured (i) to receive said metadata from a plurality of implementations of said apparatus, (ii) generate a searchable database of vehicle locations in response to said metadata and (iii) said video frames are only uploaded to said remote database after said metadata if said searchable database returns said metadata associated with said video frames in response to a request.

7. The apparatus according to claim 1, wherein (i) a GPS sensor is configured to generate alternate location coordinates and (ii) said processor is configured to use said alternate location coordinates to (a) determine said absolute location when said location coordinates from said location device are unavailable in a first mode and (b) enhance said calculation of said absolute location in a second mode.

8. The apparatus according to claim 1, wherein (i) said object comprises a license plate and (ii) said known size of said license plate is determined based on (a) a region of said license plate determined by said video analysis and (b) a type of vehicle determined by said video analysis.

9. The apparatus according to claim 8, wherein said size of said license plate detected in said video frames is determined by using said video analysis to detect four corners of said license plate.

10. The apparatus according to claim 9, wherein said video analysis performed by said processor is configured to (i) identify locations of pixels corresponding to said four corners of said license plate and (ii) determine said size of said license plate in said video frames by measuring distances between said locations of pixels.

11. The apparatus according to claim 8, wherein said size of said license plate detected in said video frames is determined by using said video analysis to (i) detect a character string on the license plate and (ii) identify a region associated with said detected character string.

12. The apparatus according to claim 8, wherein (i) said absolute location of said license plate is used to approximate a vehicle location corresponding to said license plate and (ii) an arrangement of vehicles detected in video frames is re-created by using said vehicle location from said metadata.

13. The apparatus according to claim 8, wherein said region is determined based on said location coordinates.

14. The apparatus according to claim 8, wherein said region is determined by performing said video analysis on said license plate to detect a design of said license plate and said design of said license plate is compared to known license plate designs for particular regions.

15. The apparatus according to claim 8, wherein said known size of said license plate when said type of vehicle is a motorcycle is smaller than said known size of said license plate when said type of vehicle is a car.

16. The apparatus according to claim 1, wherein (i) said object comprises a vehicle and (ii) said known size of said vehicle is determined based on a type of said vehicle determined by said video analysis.

17. The apparatus according to claim 1, wherein said metadata is correlated with said location coordinates based on said timestamps associated with said video frames and a time when said location coordinates were retrieved by said location device.

18. An apparatus comprising:

a location device configured to determine location coordinates of said apparatus; and a processor configured to (a) receive video frames captured by a capture device, (b) perform video analysis on said video frames to (i) detect an object in said video frames and (ii) extract metadata that describes characteristics of said object detected in said video frames, (c) add said location coordinates to said metadata over a number of timestamps when said processor detects said object, (d) correct a distortion of said object detected in said video frames, (e) determine a distance from said apparatus to said object in said video frames and (f) calculate an absolute location of said object in response to said distance and said location coordinates, wherein (i) said distance is determined by comparing a size of said object detected in said video frames with a known size of said object after correcting the distortion, (ii) said absolute location for said object in said video frames is added to said metadata, and (iii) said metadata comprises (a) said characteristics of said object, (b) said location coordinates of said capture device and (c) said absolute location of said object.

19. A method, executing on a processor, comprising:

receiving location coordinates of a capture device from a location device;

receiving video frames captured by said capture device;

performing video analysis on said video frames to (i) detect an object in said video frames and (ii) extract metadata that describes characteristics of said object detected in said video frames;

adding said location coordinates of said capture device to said metadata over a number of timestamps when said processor detects said object;
correcting a distortion of said object detected in said video frames;
determining a distance from said capture device to said object in said video frames by comparing a size of said object detected in said video frames with a known size of said object after correcting the distortion;
calculating an absolute location of said object in response to said distance and said location coordinates; and
adding said absolute location for said object in said video frames to said metadata, wherein said metadata comprises (a) said characteristics of said object, (b) said location coordinates of said capture device and (c) said absolute location of said object.

20. The method according to claim 19, wherein (i) said absolute location is determined by combining said location coordinates, said distance from said capture device to said object and a direction of travel, said direction of travel determined using a magnetometer configured to determine the direction of travel.

* * * * *